(12) United States Patent
Hawthorn et al.

(10) Patent No.: US 6,932,385 B2
(45) Date of Patent: Aug. 23, 2005

(54) AIR BAG RESTRAINT INCLUDING SELECTIVELY OPERABLE VENTING ELEMENTS

(75) Inventors: Laura Adelle Hawthorn, Tipp City, OH (US); Stephanie L Dunkle, Springboro, OH (US); Mark Thomas Winters, Troy, OH (US); Ryan Todd Pinsenschaum, Vandalia, OH (US)

(73) Assignee: Delphi Technologies, Inc., Troy, MI (US)

( * ) Notice: Subject to any disclaimer, the term of this patent is extended or adjusted under 35 U.S.C. 154(b) by 166 days.

(21) Appl. No.: 10/373,373

(22) Filed: Feb. 24, 2003

(65) Prior Publication Data

US 2004/0012180 A1 Jan. 22, 2004

Related U.S. Application Data

(63) Continuation-in-part of application No. 10/199,573, filed on Jul. 19, 2002, now Pat. No. 6,832,778.

(51) Int. Cl.$^7$ .............................................. B60R 21/28
(52) U.S. Cl. .................. 280/739; 280/743.2; 280/736
(58) Field of Search .............................. 280/739, 743.2, 280/734, 736, 738; B60R 21/28

(56) References Cited

U.S. PATENT DOCUMENTS

| | | | |
|---|---|---|---|
| 5,308,113 A | 5/1994 | Moriset | 280/743 |
| 5,395,134 A | 3/1995 | Gunn et al. | 280/743 |
| 5,489,119 A | 2/1996 | Prescaro et al. | 280/743.2 |
| 5,746,447 A | 5/1998 | Dyer et al. | 280/743.2 |
| 5,762,367 A | 6/1998 | Wolanin | 280/736 |
| 5,887,894 A | 3/1999 | Castagner et al. | 280/743.2 |
| 5,931,497 A * | 8/1999 | Fischer | 280/743.1 |
| 5,945,184 A | 8/1999 | Nagata et al. | 428/35.2 |
| 6,039,346 A | 3/2000 | Ryan et al. | 280/736 |
| 6,076,854 A | 6/2000 | Schenck et al. | 280/743.2 |
| 6,123,358 A | 9/2000 | Ryan et al. | 280/739 |
| 6,161,866 A | 12/2000 | Ryan et al. | |
| 6,203,061 B1 | 3/2001 | Niederman et al. | |
| 6,213,502 B1 | 4/2001 | Ryan et al. | |
| 6,237,949 B1 | 5/2001 | Nozumi et al. | 280/735 |
| 6,247,726 B1 | 6/2001 | Ryan | |
| 6,290,257 B1 | 9/2001 | Bunce et al. | 280/739 |
| 6,371,517 B1 | 4/2002 | Webber et al. | |
| 6,390,501 B1 | 5/2002 | Greib et al. | 280/743.2 |
| 6,422,597 B1 | 7/2002 | Pinsenschaum et al. | 280/735 |
| 6,425,603 B1 | 7/2002 | Eschbach | 280/743.2 |
| 6,431,596 B1 | 8/2002 | Ryan et al. | |
| 6,439,603 B2 | 8/2002 | Damman et al. | |
| 6,454,300 B1 | 9/2002 | Dunkle et al. | 280/742 |
| 6,499,765 B2 | 12/2002 | Hawthorn et al. | |
| 6,561,545 B2 | 5/2003 | Greib et al. | |
| 6,592,146 B2 | 7/2003 | Pinsenschaum et al. | |
| 6,746,044 B2 * | 6/2004 | Elqadah et al. | 280/736 |
| 6,746,045 B2 * | 6/2004 | Short et al. | 280/736 |
| 2002/0036400 A1 | 3/2002 | Winters et al. | 280/743.2 |
| 2003/0155756 A1 * | 8/2003 | Hawthorn et al. | 280/739 |
| 2004/0051285 A1 * | 3/2004 | Fischer | 280/739 |
| 2004/0094941 A1 * | 5/2004 | Waid et al. | 280/736 |

FOREIGN PATENT DOCUMENTS

| | | | |
|---|---|---|---|
| EP | 1 112 902 A2 | * | 7/2001 |
| JP | 2001-171456 A | * | 6/2001 |
| JP | 2002-211348 | * | 7/2002 |
| JP | 2001-301555 A | * | 10/2004 |

* cited by examiner

*Primary Examiner*—Ruth Ilan
(74) *Attorney, Agent, or Firm*—Scott A. McBain

(57) ABSTRACT

An air bag safety system for cushioning restraint of a vehicle occupant during an impact event. The safety system includes a variable depth inflatable air bag cushion inflated by a gas emitting inflator within an inflator housing. A cover element of substantially pliable material is located in adjustable relation to a vent opening across a wall of the housing. The cover element is selectively displaceable relative to the vent opening in response to the inflation depth of the air bag cushion so as to adjust venting characteristics across the housing.

15 Claims, 20 Drawing Sheets

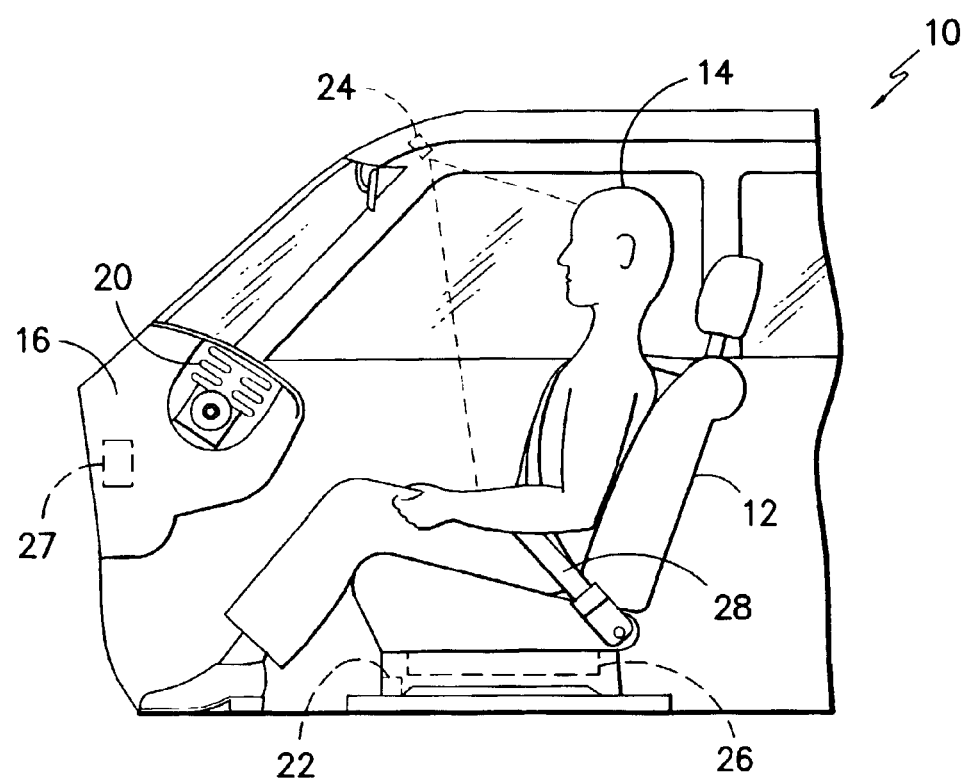
FIG. -1-

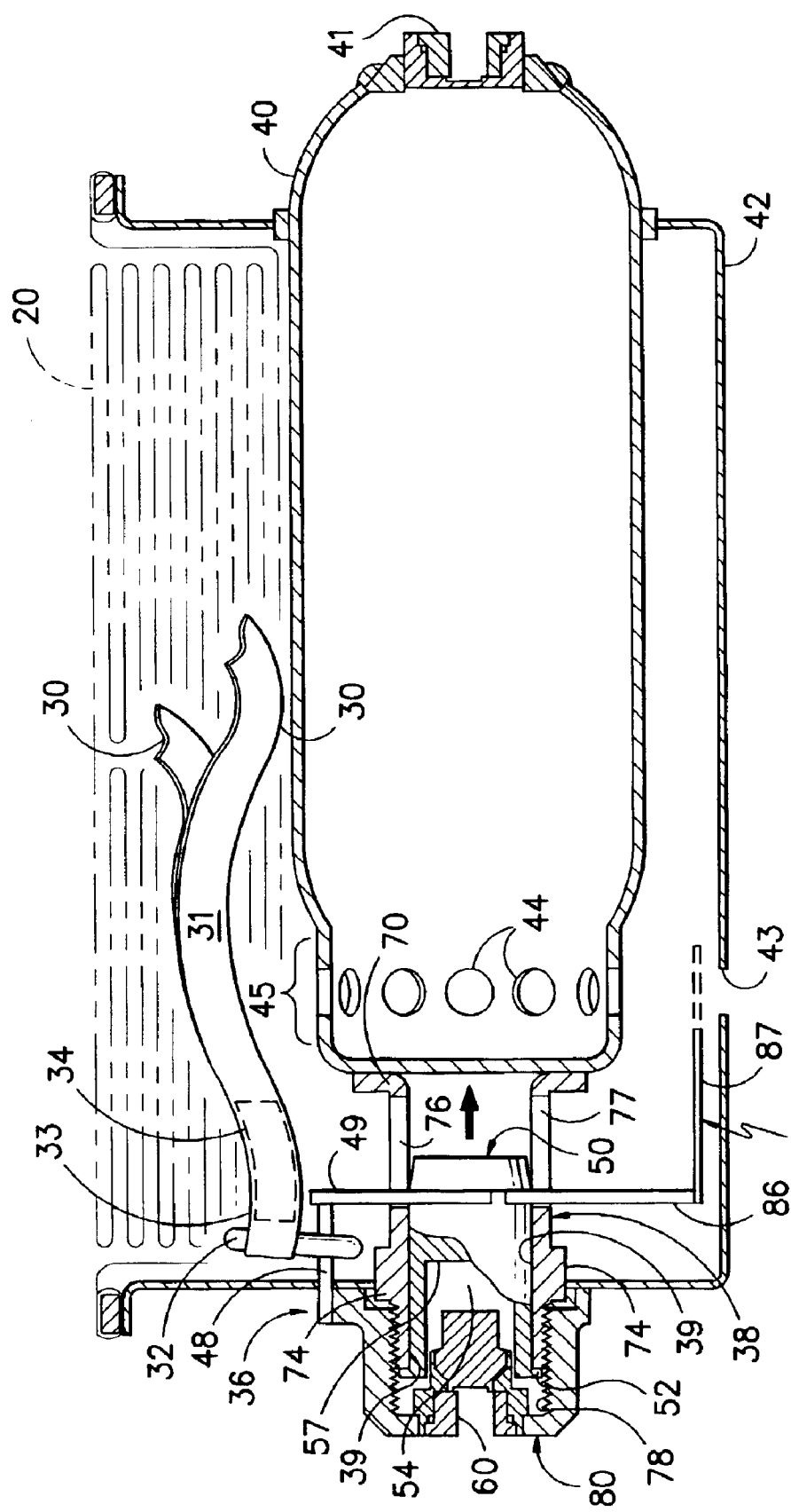
FIG. -2-

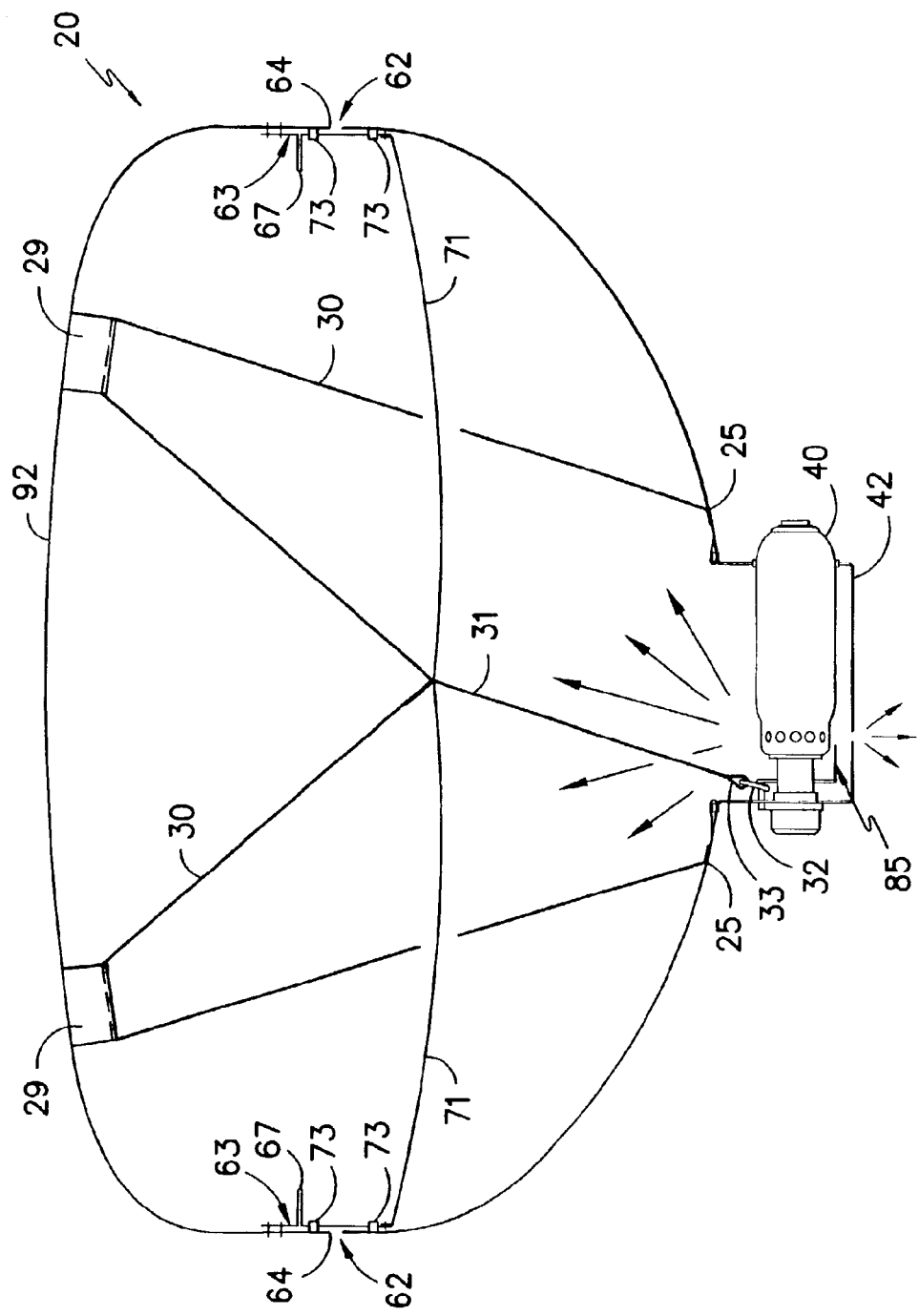
FIG. —3A—

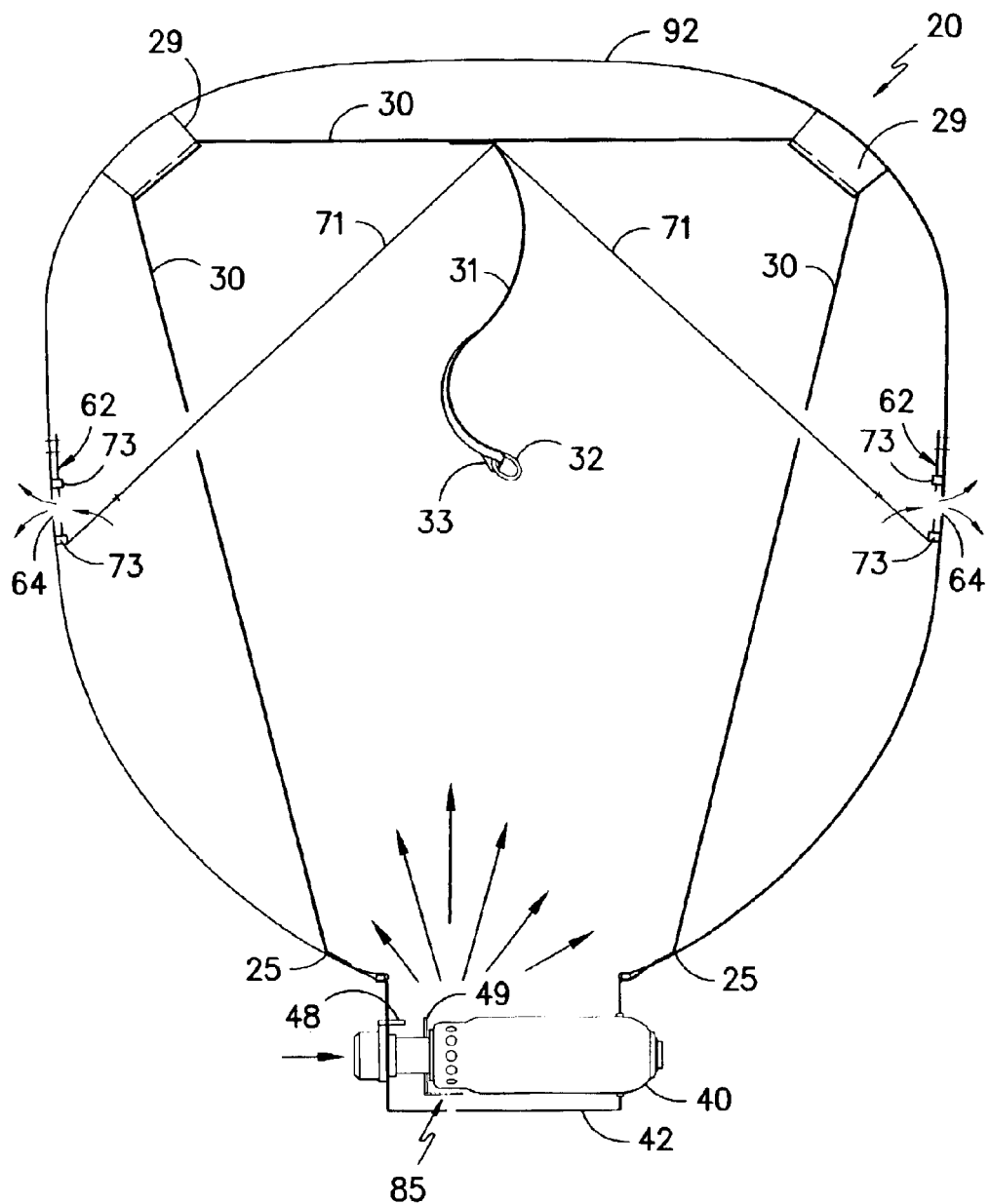
FIG. —3B—

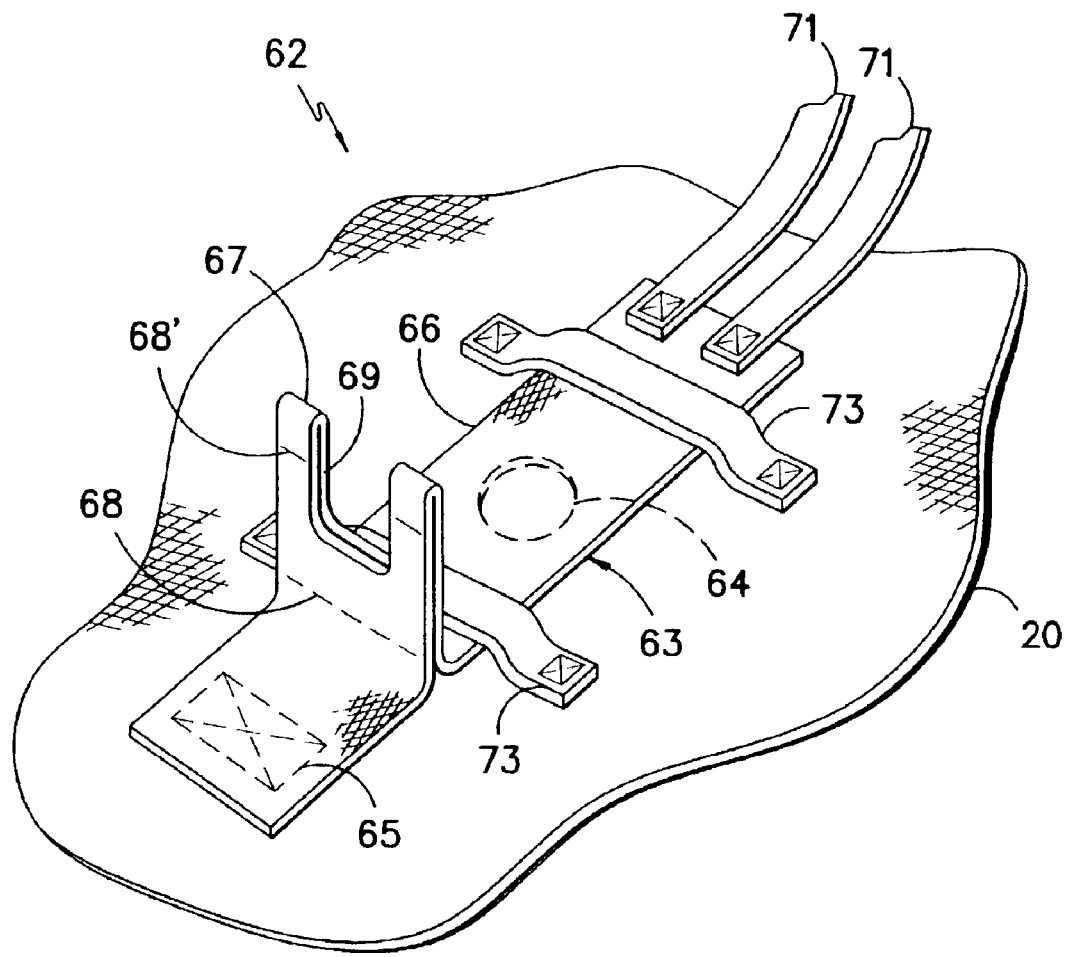
FIG. —4A—

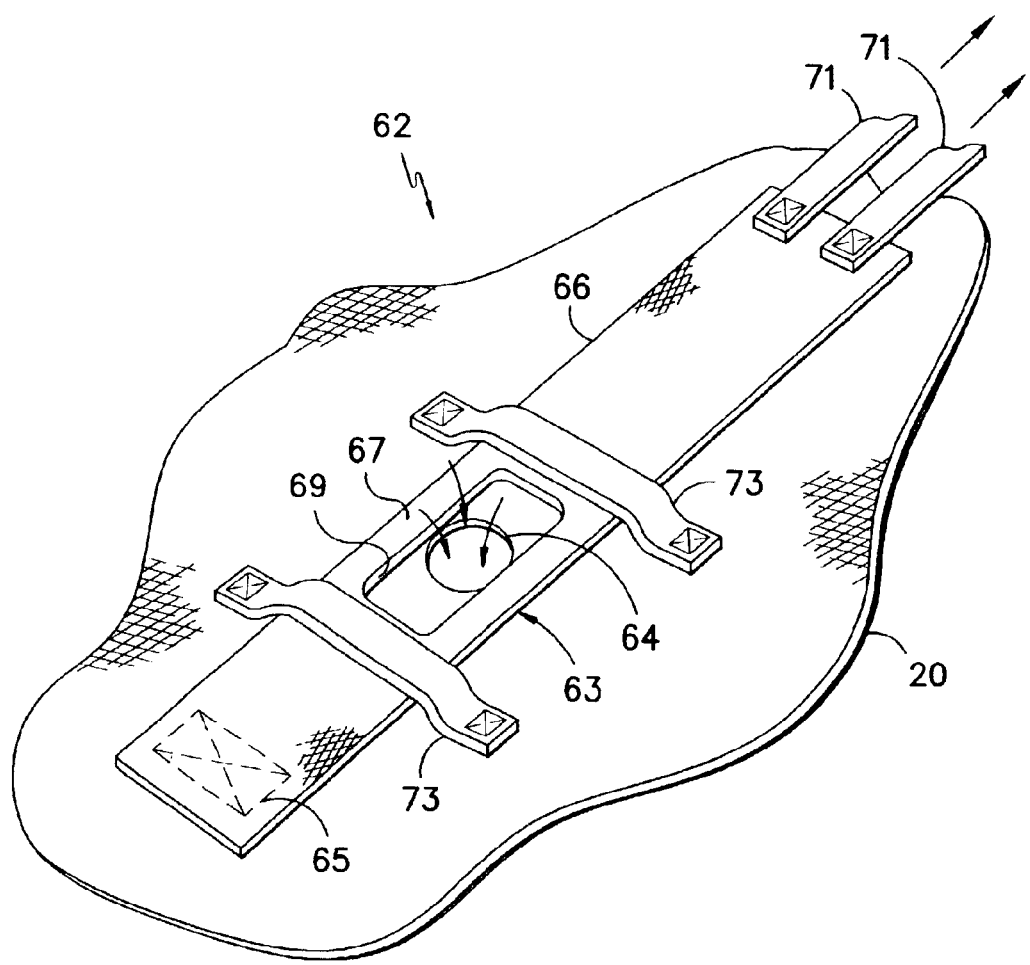
FIG. —4B—

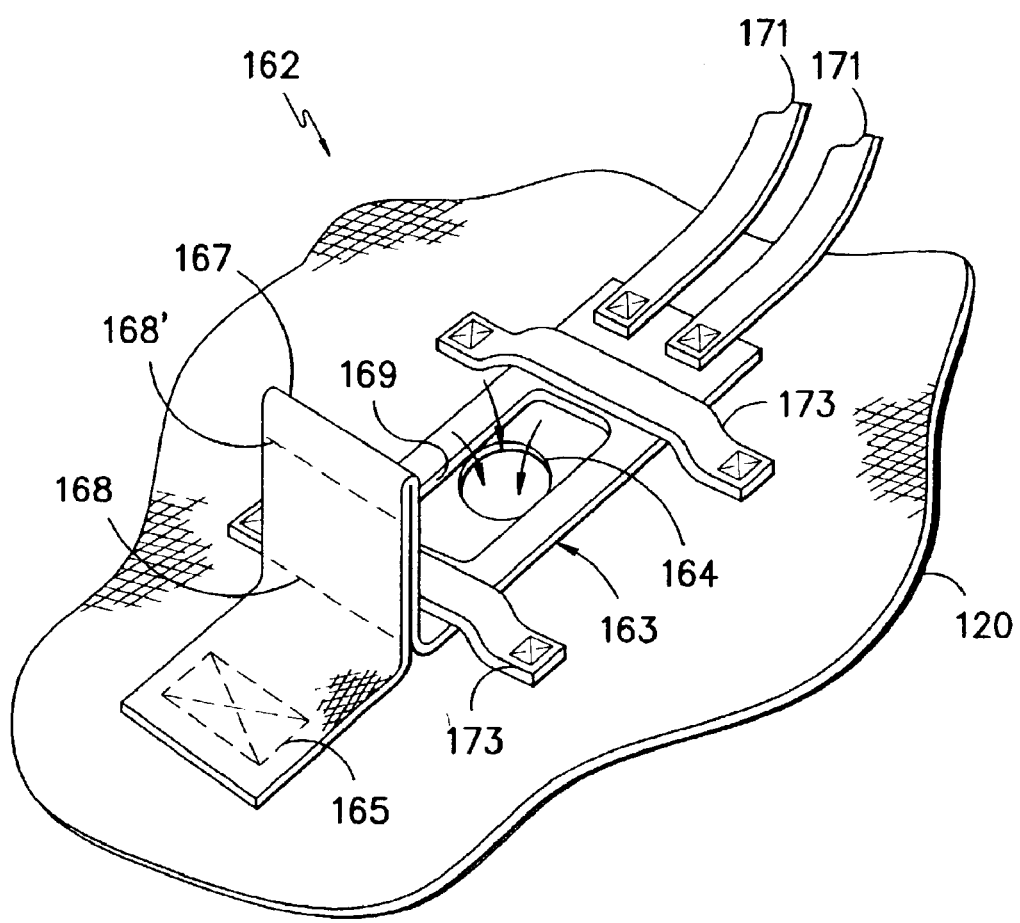
FIG. —5A—

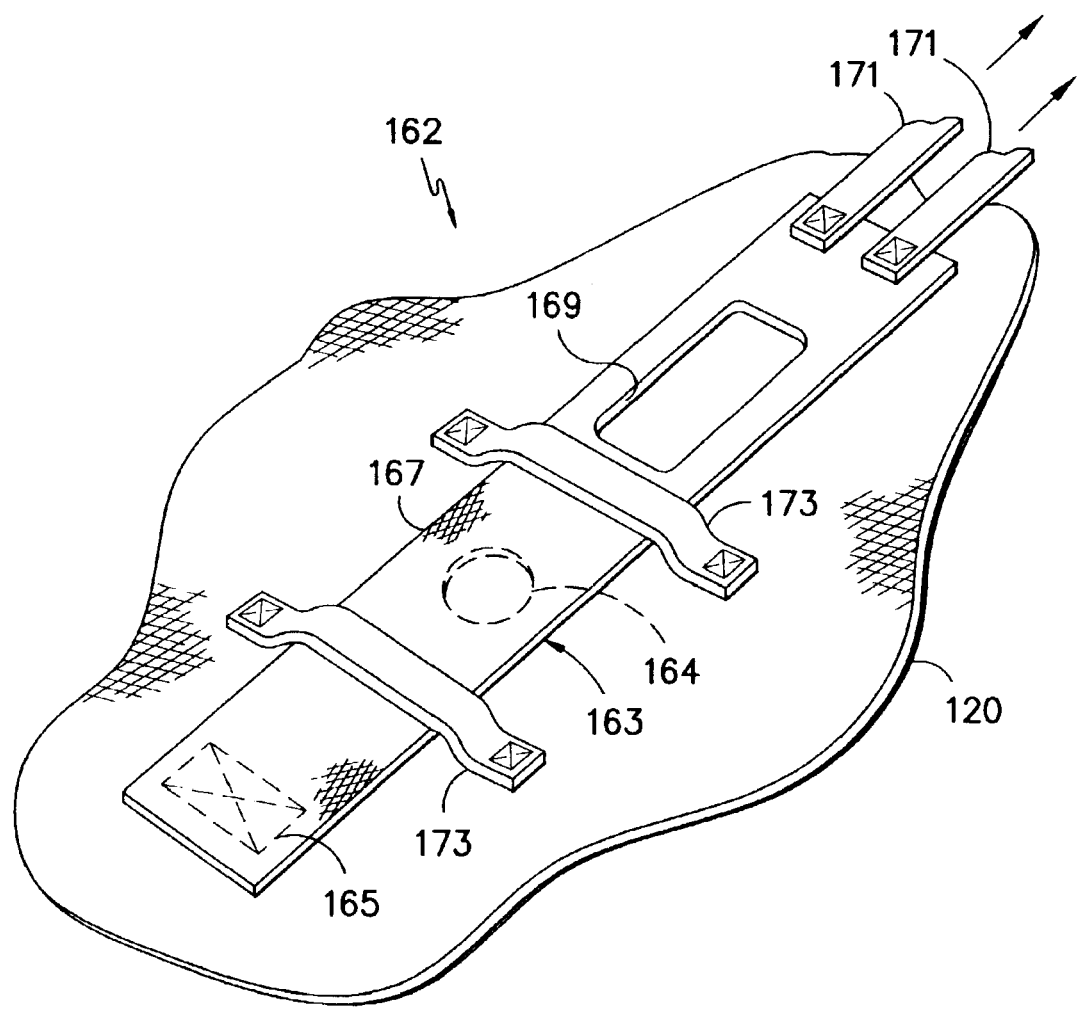
FIG. —5B—

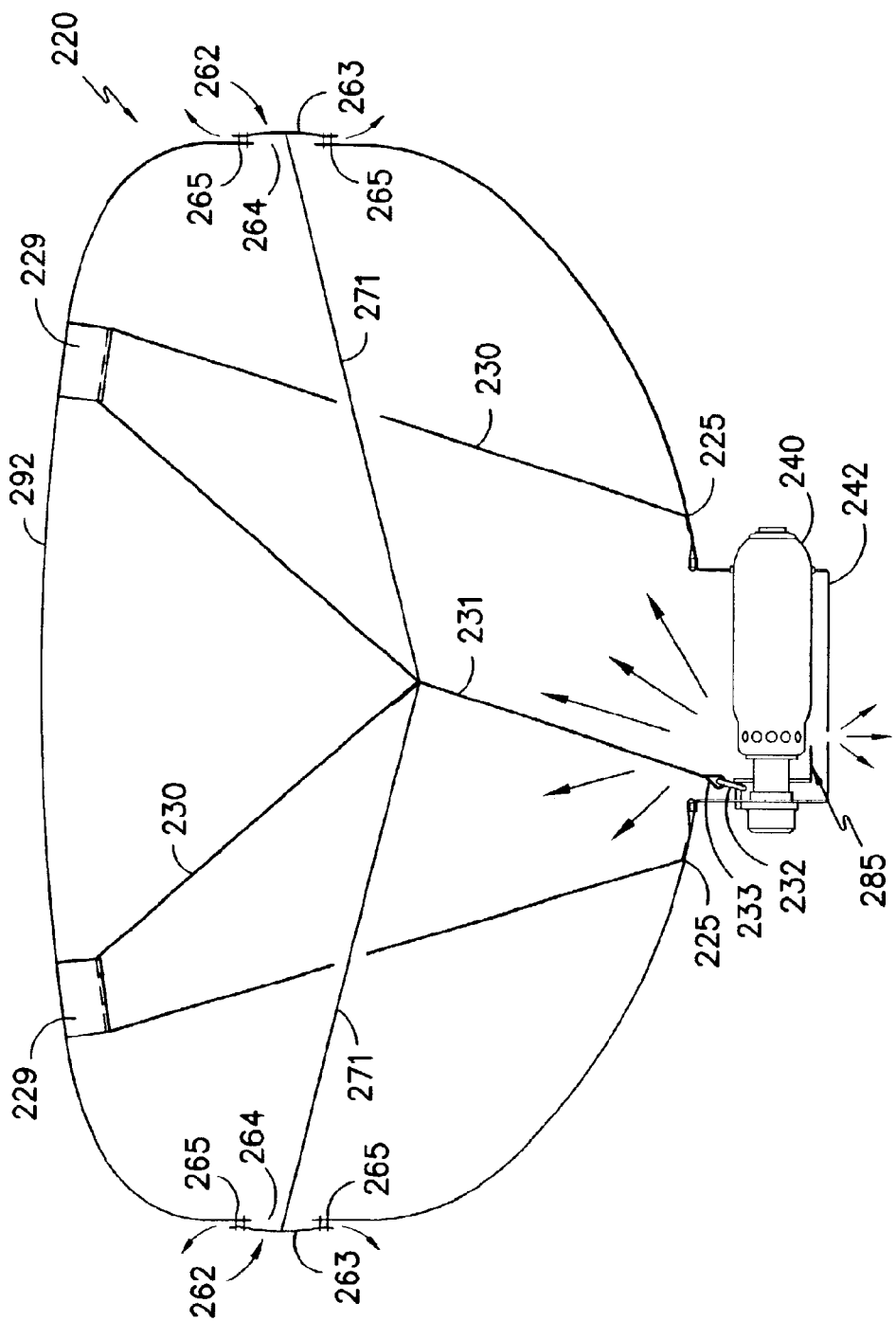
FIG. -6A-

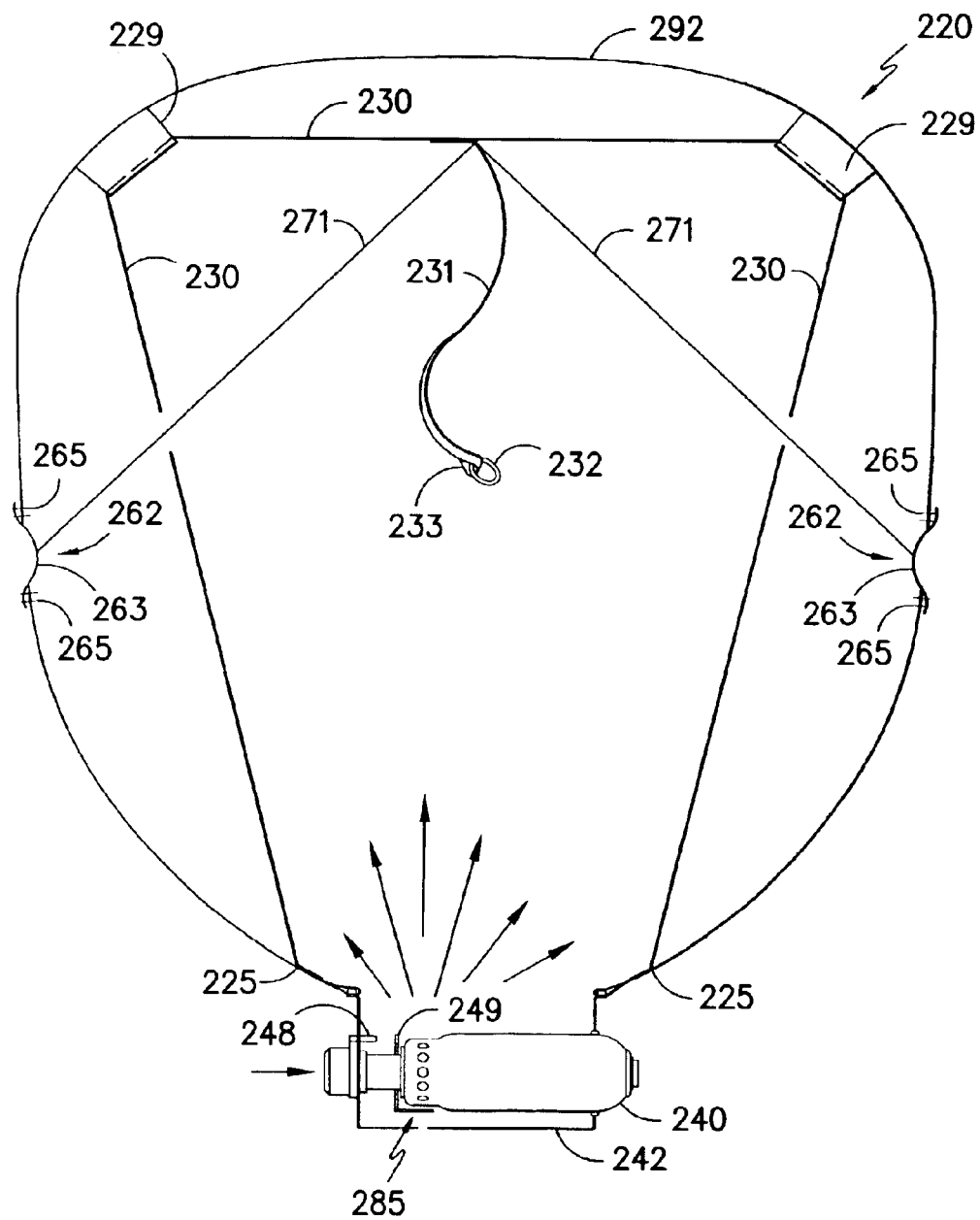
FIG. —6B—

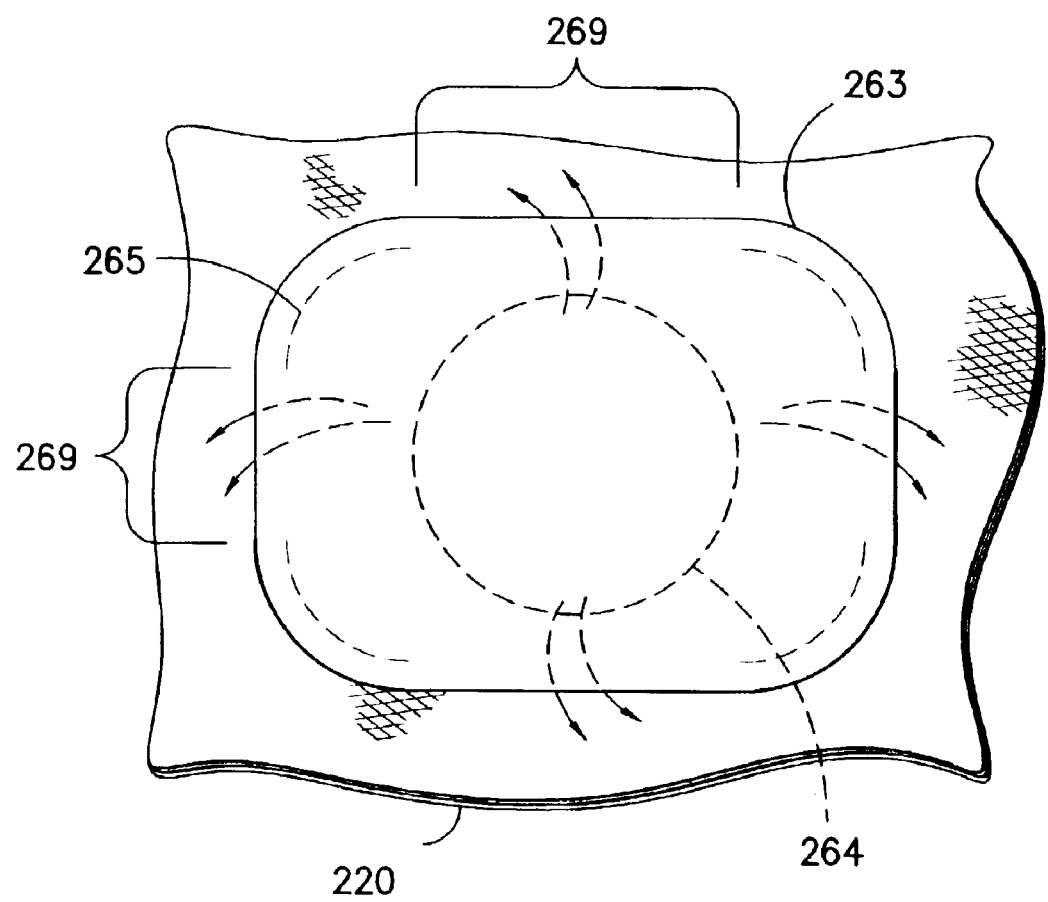
FIG. —7—

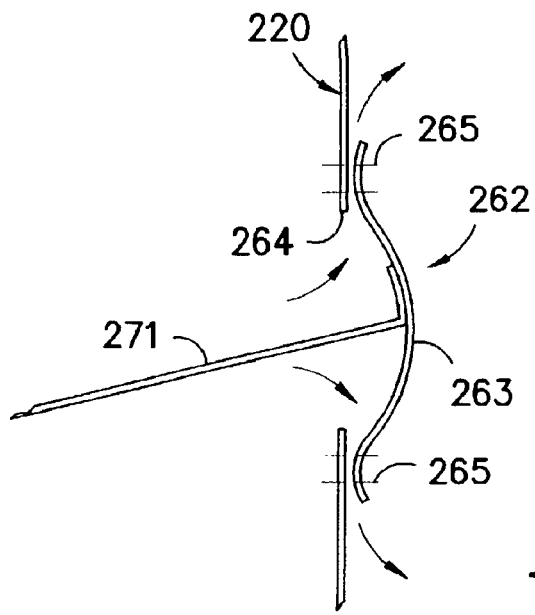
FIG. −8A−
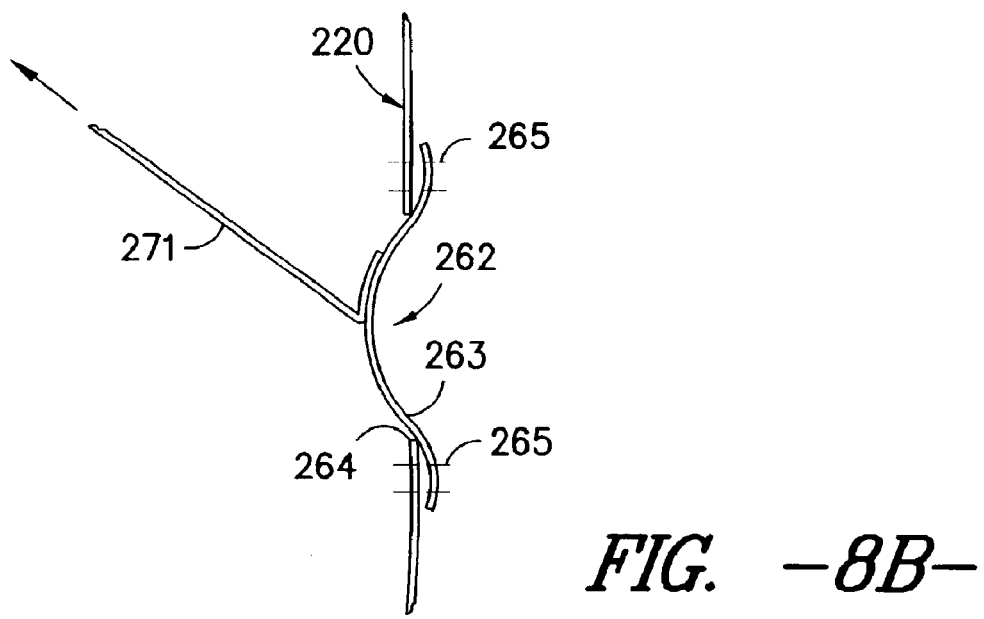
FIG. −8B−

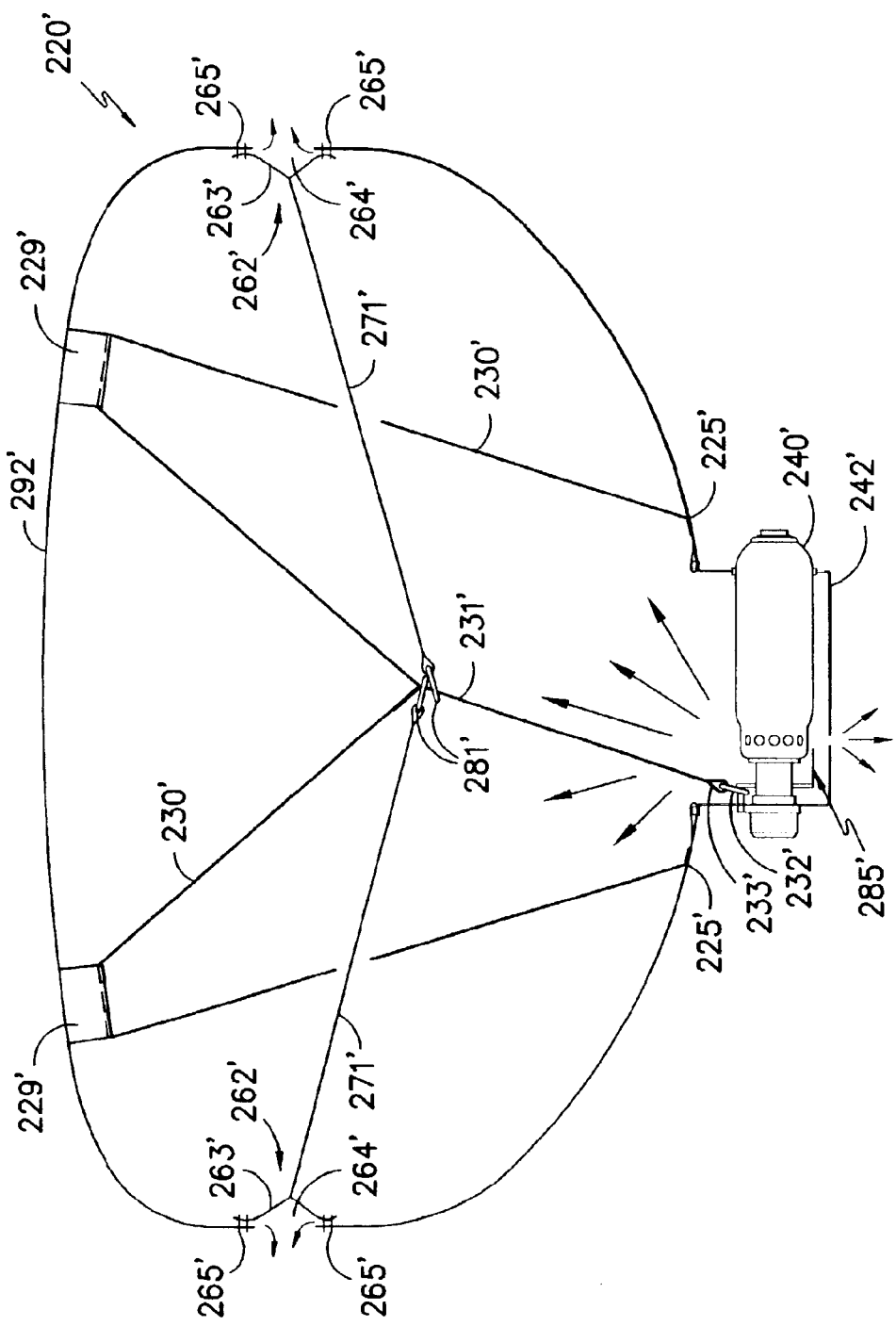
FIG. -9A-

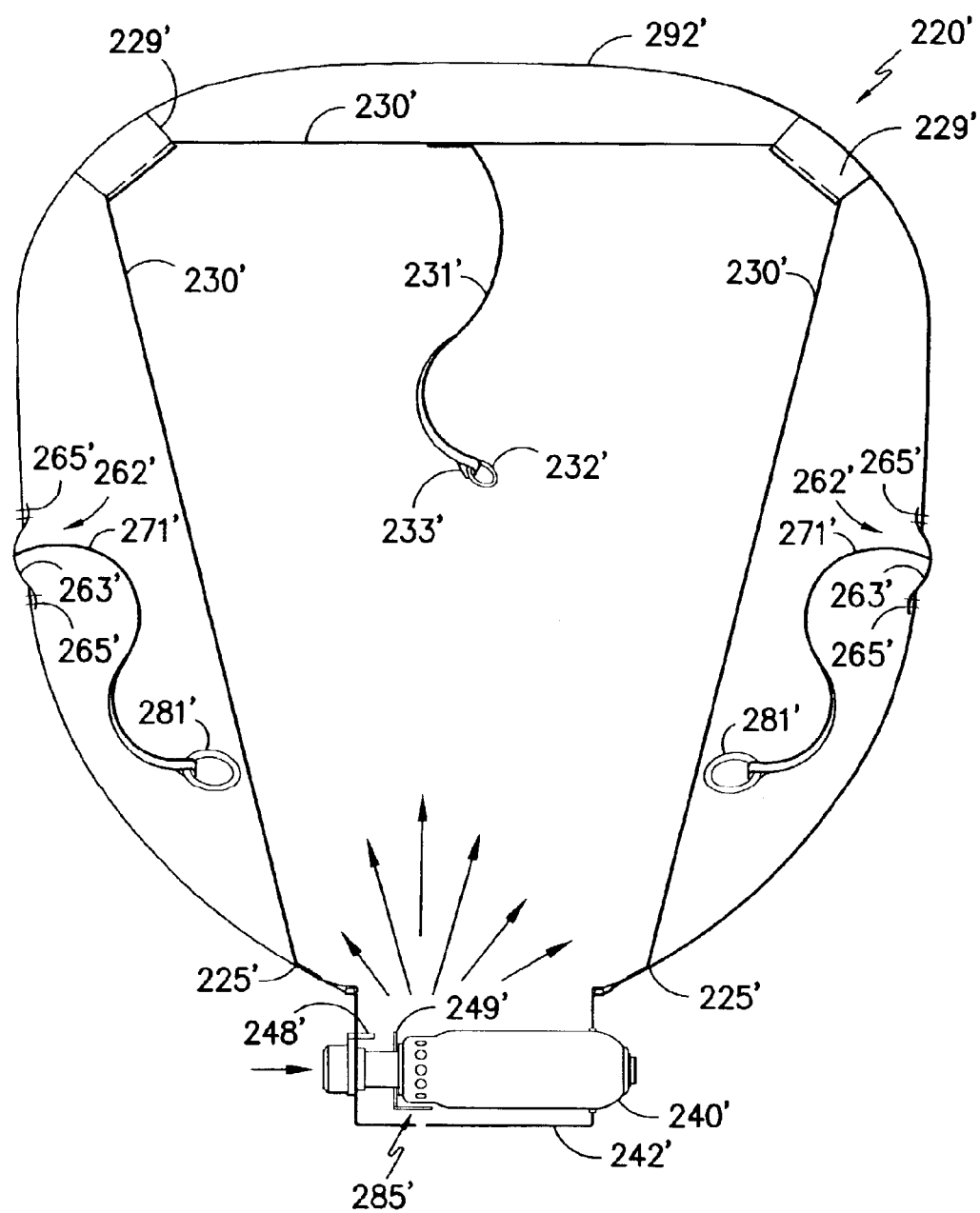
FIG. -9B-

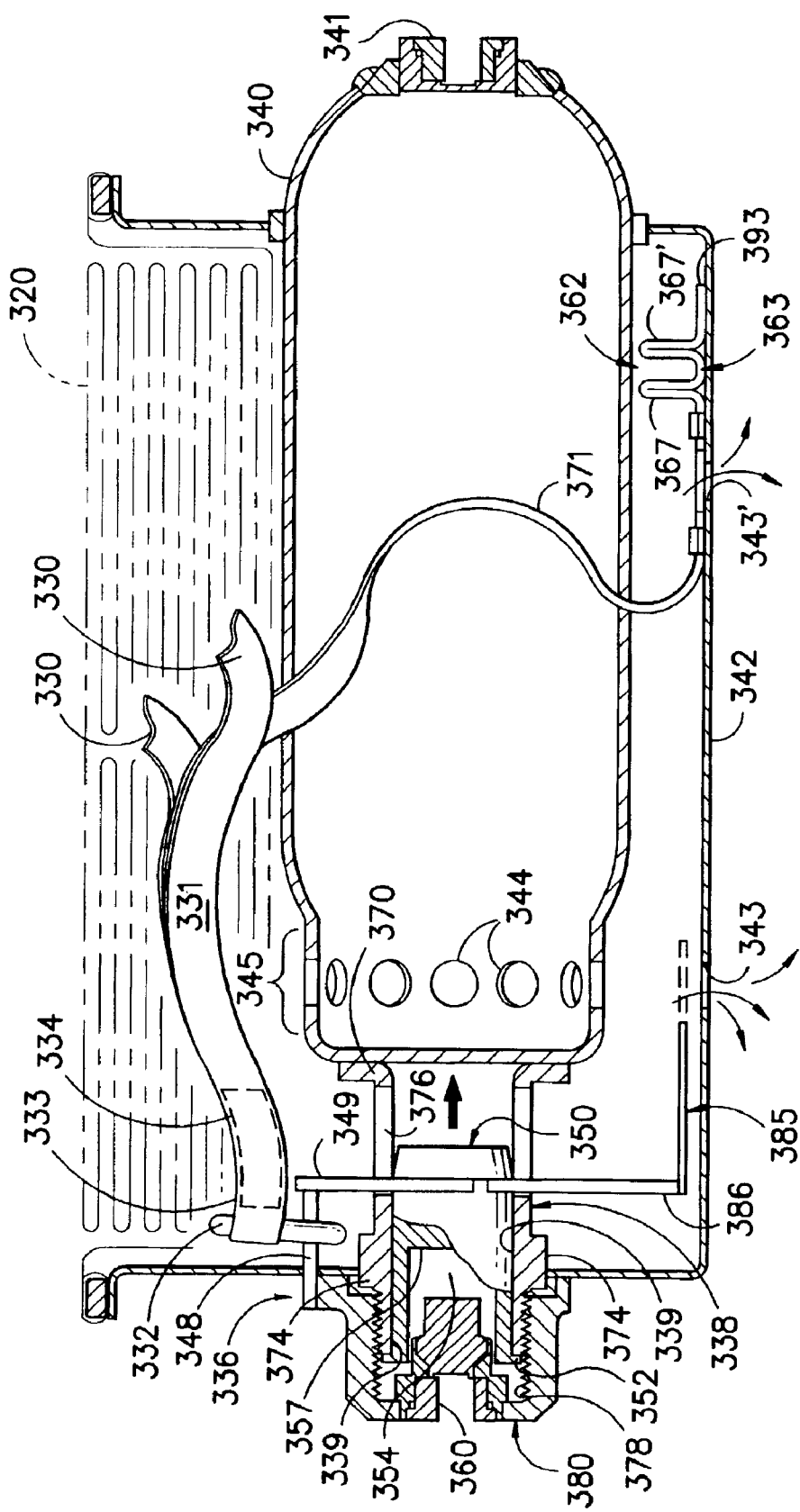
FIG. -10-

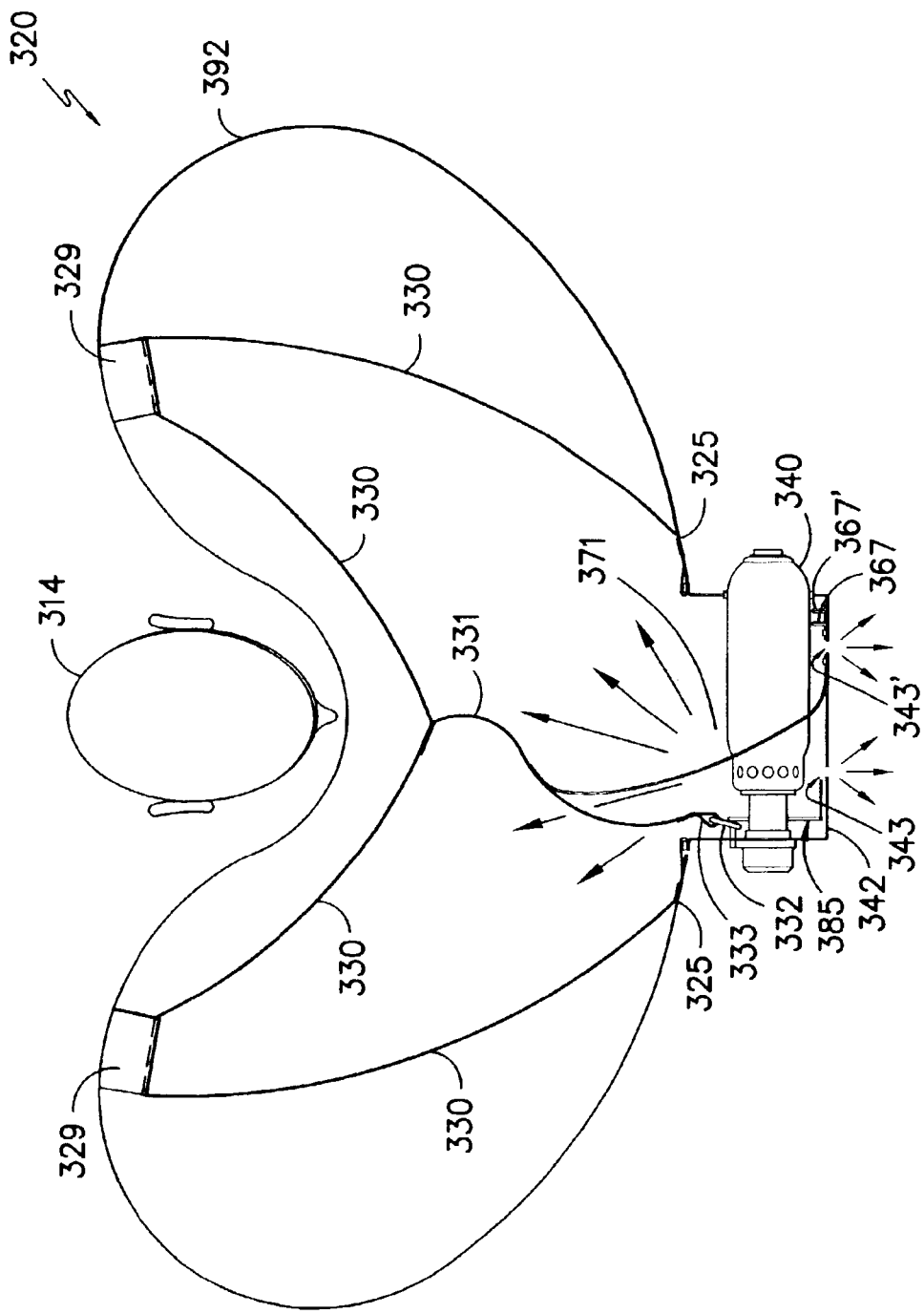
FIG. -11A-

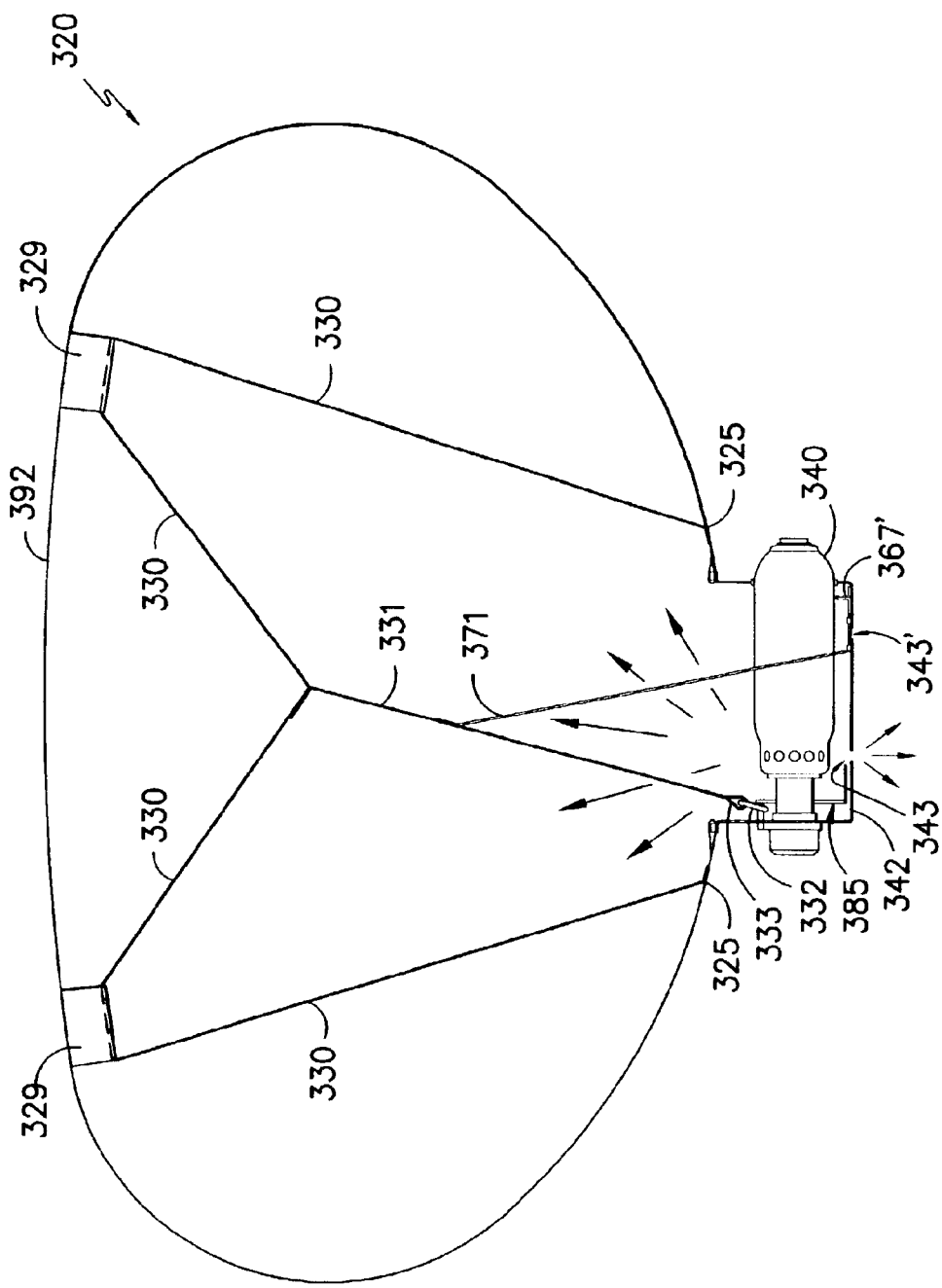
FIG. -11B-

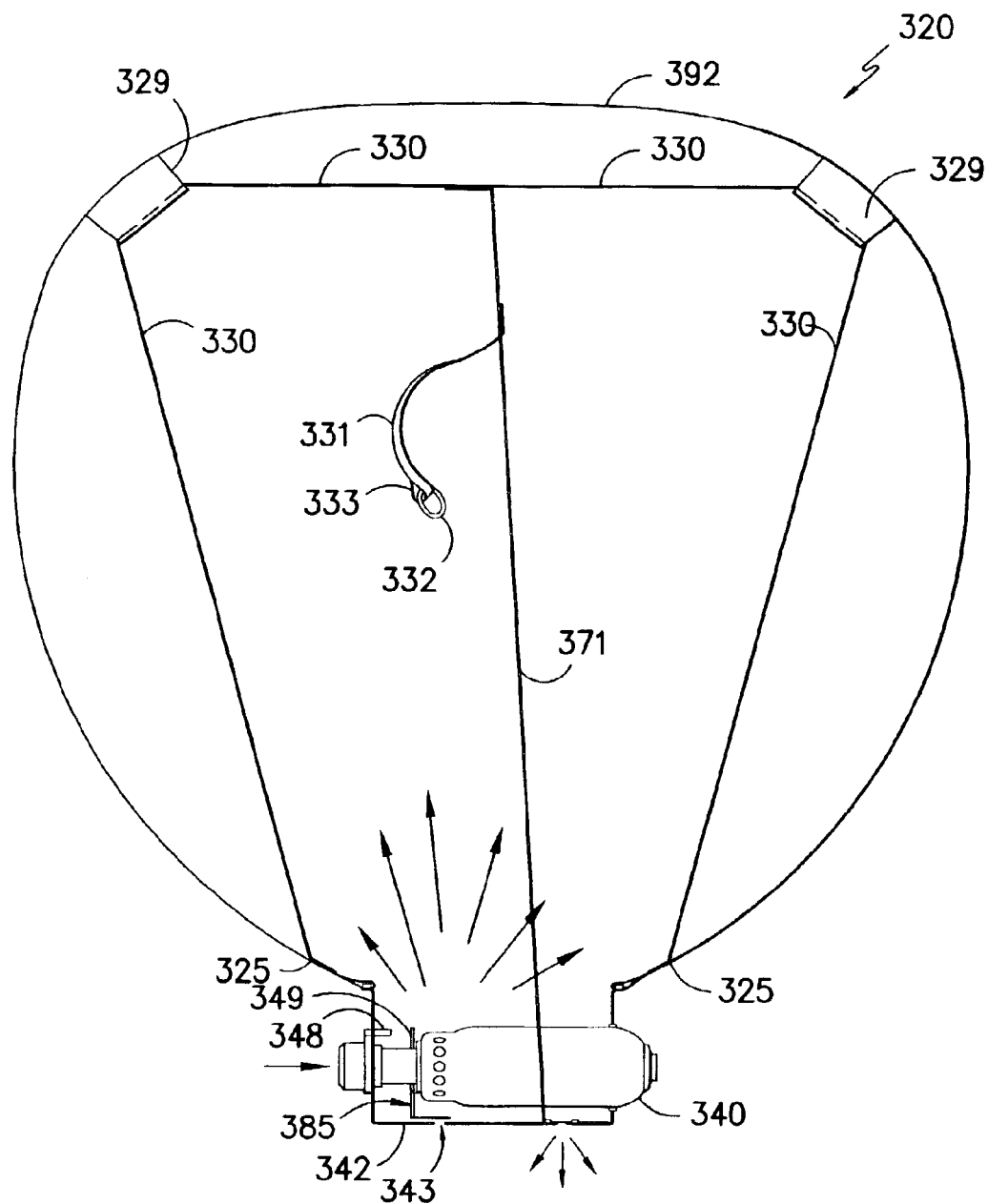
FIG. —11C—

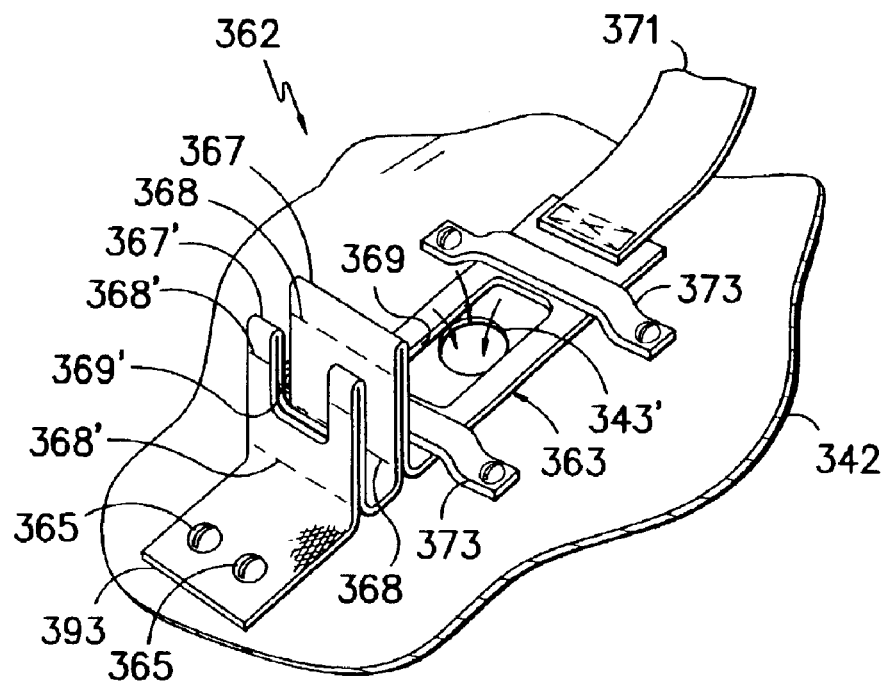
FIG. -12A-
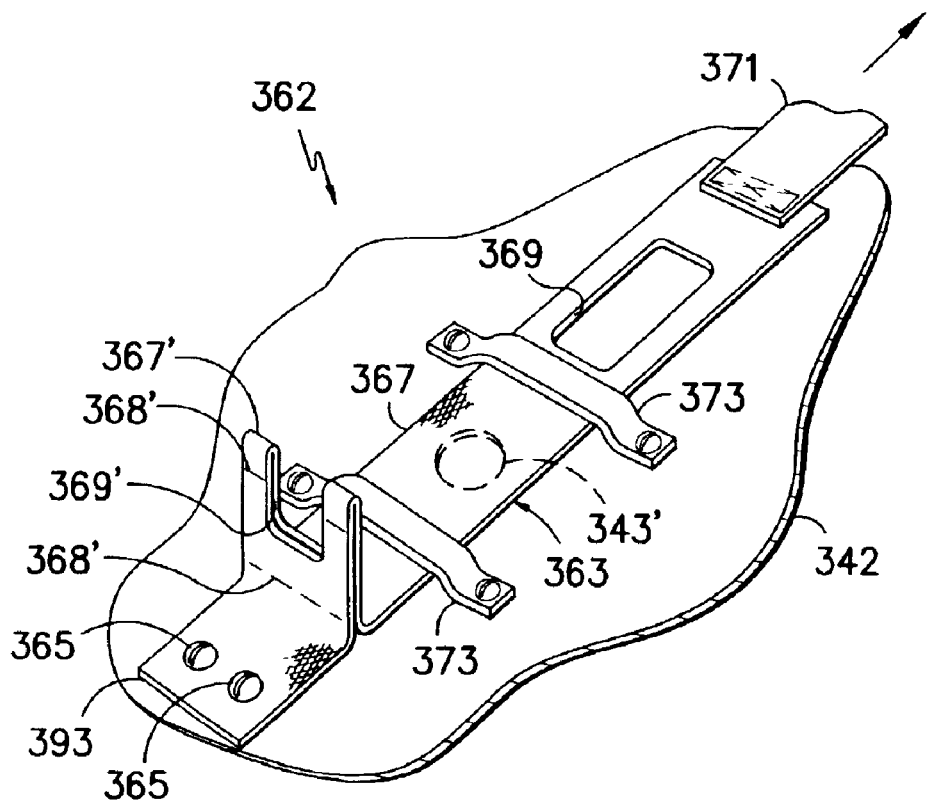
FIG. -12B-

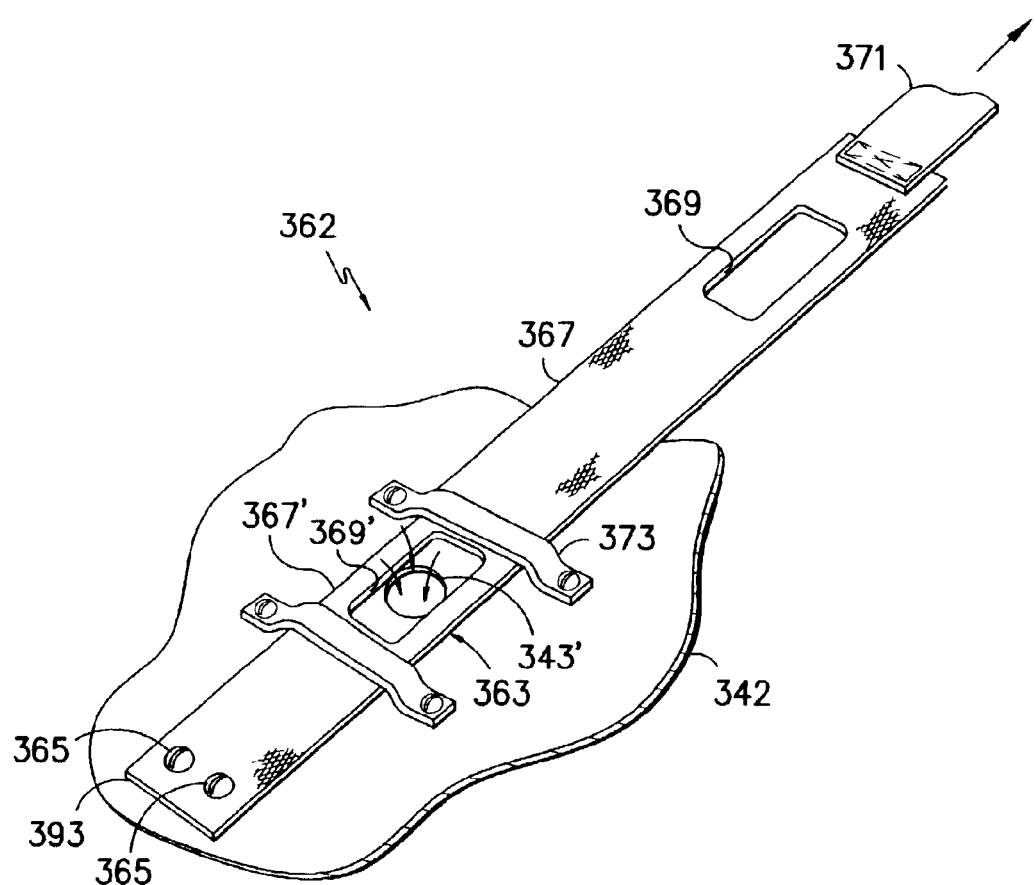
FIG. —12C—

AIR BAG RESTRAINT INCLUDING SELECTIVELY OPERABLE VENTING ELEMENTS

CROSS-REFERENCE TO RELATED APPLICATIONS

This application is a Continuation-in-Part of prior application Ser. No. 10/199,573 having a filing date of Jul. 19, 2002 now U.S. Pat. No. 6,832,778, the contents of which are incorporated by reference in their entirety as if fully set forth herein.

TECHNICAL FIELD

This invention relates to an air bag assembly, and more particularly to an air bag assembly including an inflatable air bag cushion in communication with a gas emitting inflator. One or more selectively actuated vents are disposed within the air bag cushion and/or within a housing holding the inflator. The vents are selectively actuated in conjunction with control of the inflated profile of the air bag cushion such that venting is properly matched to the inflated profile characteristics of the air bag cushion.

BACKGROUND OF THE INVENTION

It is well known to provide an air bag assembly including an inflatable air bag cushion for protecting the occupant of a transportation vehicle. In an automotive vehicle such air bag assemblies are typically located within the hub of the steering wheel and in a recess in the vehicle instrument panel for protection of the vehicle occupants seated in opposing relation to such assemblies. Additional air bag assemblies may be located within the seats and/or door panels for protection of the occupants during a side-impact event. It is also known to utilize inflatable curtain-like structures for deployment from the structural pillars or roof line of the motor vehicle so as to promote restraint and protection of the vehicle occupant during a roll-over event.

Air bag assemblies typically include an inflatable cushion in fluid communication with a gas emitting inflator. Upon sensing certain predetermined vehicle conditions, such as a certain level of vehicle deceleration, the inflator discharges a fixed amount of inflator gas thereby forcing the air bag into a deployed position. The inflator gas occupies the available volume within the air bag cushion thereby forcing the air bag cushion to expand outwardly to the extent permitted by its construction. The pressure within the air bag cushion upon deployment is proportional to the quantity of inflator gas expelled into the air bag and inversely proportional to the volume occupied by the inflator gas within the air bag. As the occupant comes into contact with the expanded air bag, the inflator gas is forced out of the air bag thereby dissipating the kinetic energy of the occupant achieving a so called "ride down" effect. In order to facilitate the discharge of inflator gas from the air bag it is common to incorporate vents in the form of normally open fixed diameter apertures across the walls of the air bag.

It has been recognized that in some instances it may be desirable to adjust the inflation characteristics of the air bag to reflect the nature of the impact event and/or the size and/or the position of the occupant to be protected. In order to provide a degree of control over the gas pressure within the air bag cushion it is known to use an inflator that has varied levels or stages of inflator gas output in response to the sensing of different vehicle or occupant conditions. Thus, it is generally known in the prior art to utilize so-called "dual-stage" inflators that discharge predetermined amounts of gas at different discrete levels.

In order to provide additional control over the inflation characteristics of the air bag cushion it has been suggested to utilize tethering elements in the form of straps or webs extending between surfaces of the air bag which may be released from a first restrained operative length to a second extended operative length upon the occurrence of vehicle conditions warranting an increased air bag profile. It has also been suggested to utilize air bag cushions which incorporate sewn or woven in seams within the air bag to control the expanded geometry of the inflated air bag wherein the seams separate upon the introduction of pressures exceeding a certain level thereby freeing the air bag cushion from the restraint imposed by the seams at lower pressures.

SUMMARY OF THE INVENTION

The present invention provides advantages and alternatives over the prior art by providing an air bag assembly including one or more selectively activatable vents within an air bag cushion and/or inflator housing which may be either opened or closed based upon desired cushion profile characteristics such that venting is selectively controlled in a predefined manner.

The air bag assembly provides a simple, cost effective and highly reproducible mechanism for controlling inflation and venting characteristics in conjunction with control of the profile and performance of deployed air bag cushions.

BRIEF DESCRIPTION OF THE DRAWINGS

The present invention will now be described by way of example only, with reference to the accompanying drawings which constitute a part of the specification herein and in which:

FIG. 1 is a cut-away view of a vehicle interior showing an air bag cushion in a stored undeployed state in opposing relation to a vehicle occupant;

FIG. 2 is a cut-away view of an exemplary air bag module including an inflator and one exemplary embodiment of an actuation mechanism for simultaneously controlling the extension of tethering elements and discharge of inflation gas into an air bag cushion;

FIG. 3A illustrates an arrangement of profile restricting tethers of variable effective length and selectively activatable vents in an air bag cushion and inflator housing wherein the air bag cushion is restrained to a diminished profile with the vents in a closed gas blocking orientation and excess inflation gas is vented through an opening in the inflator housing;

FIG. 3B is a view similar to FIG. 3A wherein the air bag cushion is in an expanded profile configuration with the cushion vents in an open gas emitting orientation and the opening in the inflator housing is blocked;

FIG. 4A is a detailed view of a normally closed selectively activatable vent in a gas blocking orientation;

FIG. 4B is a view similar to FIG. 4A wherein the vent is in an open gas emitting orientation;

FIG. 5A is a detailed view of a normally open selectively activatable vent in an open gas emitting orientation;

FIG. 5B is a view similar to FIG. 5A wherein the vent is in a closed gas blocking orientation;

FIG. 6A illustrates an arrangement of profile restricting tethers of variable effective length and selectively activatable patch-like vents in an air bag cushion wherein the air bag cushion is restrained to a diminished profile with the vents in an open gas emitting orientation and excess inflation gas is vented through an opening in the inflator housing;

FIG. 6B is a view similar to FIG. 6A wherein the air bag cushion is in an expanded profile configuration with the vents in a closed gas blocking orientation and the opening in the inflator housing is blocked;

FIG. 7 is an enlarged view of an exemplary patch-like vent as may be used in the air bag cushion illustrated in FIGS. 6A and 6B;

FIG. 8A is an enlarged view of a patch-like vent in an open gas emitting orientation as illustrated in FIG. 6A;

FIG. 8B is an enlarged view of a patch-like vent in a closed gas blocking orientation as illustrated in FIG. 6B.

FIG. 9A illustrates an arrangement of profile restricting tethers of variable effective length and selectively activatable patch-like vents in an air bag cushion wherein the air bag cushion is restrained to a diminished profile with the vents in an open tensioned gas emitting orientation and excess inflation gas is vented through an opening in the inflator housing;

FIG. 9B is a view similar to FIG. 9A wherein the air bag cushion is in an expanded profile configuration with the vents in a sealed gas blocking orientation and the opening in the inflator housing is blocked;

FIG. 10 is a view similar to FIG. 2 incorporating a selective vent arrangement with a vent opening located in the gas emitter housing;

FIG. 11A illustrates one arrangement of profile restricting tethers of variable effective length wherein the air bag cushion is restricted to a diminished profile shown with respect to one position of an occupant in proximity to the air bag cushion and wherein venting across the inflator housing is maximized so as to establish desired pressure characteristics in the air bag cushion;

FIG. 11B is a view similar to FIG. 11A wherein a primary vent opening in the inflator housing is open and a secondary vent opening in the inflator is restricted by a displaceable cover thereby delivering an intermediate volume of inflation gas to the cushion so as to establish desired pressure characteristics in the air bag cushion;

FIG. 11C is a view similar to FIG. 11A and FIG. 11B wherein tethering elements are released to an extended operative length and wherein a primary vent opening in the inflator housing is obstructed and a secondary vent opening in the inflator is open thereby delivering a large volume of inflation gas to the cushion while maintaining desired pressure characteristics in the air bag cushion;

FIG. 12A is a detailed view of a tension activated vent assembly for use at the interior of an inflator housing in an initially open position corresponding to the orientation in FIG. 11A showing the orientation of a displaceable cover element and connections to a tensioning strap to extend the cover element so as to close and subsequently reopen the vent in the inflator housing;

FIG. 12B is a detailed view similar to FIG. 12A showing the orientation and rearrangement of the cover element in a position corresponding to the orientation in FIG. 11B so that a vent opening in the gas emitter housing is obstructed or closed; and FIG. 12C is a detailed view similar to FIG. 12A and FIG. 12B showing continued reorientation and rearrangement of the cover element in a position corresponding to the orientation in FIG. 11B so that the vent opening in the gas emitter housing is reopened by the cover element.

While the invention has been illustrated and generally described above and will hereinafter be described in connection with certain potentially preferred embodiments, procedures and practices, it is to be understood that in no event is the invention to be limited to such illustrated and described embodiments procedures and practices. On the contrary, it is intended that the present invention shall extend to all alternatives and modifications as may embrace the principles of this invention within the true spirit and scope thereof.

DESCRIPTION OF THE PREFERRED EMBODIMENTS

Reference will now be made to the drawings, wherein to the extent possible like reference numerals are utilized to designate like components throughout the various views. In FIG. 1 it is seen that a vehicle 10 may include a seating structure 12 which supports an occupant 14 in generally opposing relation to a dash panel 16. An inflatable air bag cushion 20 may be housed within the dash panel 16 for outward deployment towards the occupant 14 in the event of a collision.

While the air bag cushion 20 is illustrated for descriptive purposes in relation to a vehicle passenger, it is to be understood that the present invention is in no way intended to be limited to a passenger side configuration. On the contrary, it is contemplated that the present invention may have equal applicability to air bag deployment in opposing relation to the operator (not shown) of the vehicle from the steering column (not shown) as well as in relation to air bags deployed from other regions within the vehicle interior including, by way of example only, side impact air bags and inflatable curtain structures.

It is contemplated that the vehicle interior may include a seat position sensor 22 to detect the position of the occupant 14 relative to the dash panel 16. It is further contemplated that the vehicle 10 may include additional position sensors such as an optical scanner 24 or the like to measure both the volume and position of the occupant to be protected. It is contemplated that the interior of the vehicle 10 may also be provided with a scale 26 disposed within the seating structure 12 so as to provide additional data regarding the load to which the inflatable air bag cushion 20 may be subjected. The seating structure 12 may also be provided with sensing elements to measure the degree to which the seating structure 12 is reclined. The vehicle 10 may also be provided with sensors to determine and communicate whether or not the occupant is utilizing the recommended seat belt structures 28. The data so collected may be utilized to determine desirable expanded profile and venting characteristics for the air bag cushion 20.

According to one exemplary form of the invention, the air bag cushion 20 has a first expanded profile and at least a second expanded profile which is characterized by greater depth and volume than the first expanded profile. One or more tethering elements 30 (FIGS. 3A–3B) in the form of straps or webs are preferably utilized to control the inflated profile of the air bag cushion 20.

By way of example only and not limitation, according to the illustrated exemplary embodiment illustrated in FIGS. 3A and 3B, the tethering elements 30 are disposed across the interior of the air bag cushion 20 and extend in a travel path between fixed points of connection 25 at the surface of the air bag cushion 20. The tethering elements 30 may be further connected to the surface of the air bag cushion 20 at locations along the travel path by guide elements 29 such as sleeves at an impact face portion 92 such that the tethering elements can slide through the guide elements 29. As shown in FIG. 3A, the operative length of the tethering elements 30 may be shortened by drawing a portion of the tethering elements 30 intermediate the fixed points of connection 25 towards an anchoring structure remote from the air bag cushion 20. Such a shortening in the operative length of the tethering elements 30 causes the depth of the air bag cushion 20 to be restrained. As shown in FIG. 3B, the operative length of the tethering elements 30 is increased when the tethering elements 30 are released from the anchoring position.

The release or retention of the tethering elements 30 is preferably carried out at the time of inflation of the air bag cushion 20 based upon the preferred profile character of the air bag cushion 20 in view of the measured impact severity and physical character and position of the occupant 14. That is, if the physical character and orientation of the occupant 14 in combination with the nature of the impact are such that a deep profile is desired, then the tethering elements are released from their anchored position to assume an increased operative length at the time of inflation thereby permitting the inflatable air bag cushion 20 to assume an expanded profile of enhanced depth. Conversely, in the event that the physical character and orientation of the occupant 14 in combination with the nature of the impact event are such that the inflatable air bag cushion 20 is preferably of a more shallow profile, then the tethering elements 30 remain anchored in a restricted operative length during deployment of the inflatable air bag cushion 20 so as to restrain the final profile thereof.

As shown, it is contemplated that the tethering elements 30 may remain connected to at least two secure points of attachment 25 at locations across the surface of the air bag cushion. Such connection provides for the continued restraint of the air bag cushion 20 by the tethering elements even after the operative length is increased. That is, even with an enhanced operating length, the tethering elements continue to contour the profile of the air bag cushion 20.

By way of example only and not limitation, one possible mechanism for the controlled retention and release of the tethering elements 30 is shown in FIG. 2. As shown, in the illustrated embodiment one or more tethering elements 30 are operatively connected to an anchoring strap 31 which in turn is passed through the opening at the interior of a ring element 32 so as to form a loop 33 which can slide along the length of the ring element 32. The configuration of the loop 33 is thereafter maintained by attaching the surfaces of the looped anchoring strap 31 by stitching 34 along a length remote from the ring element 32. As will be appreciated, it is contemplated that a single tether 30 or multiple tethers may be operatively attached to the ring element either directly or through use of an anchoring strap 31. That is, the anchoring strap 31 may be eliminated if desired. The material forming the tethering elements 30 and the anchoring strap 31 are preferably of pliable nature such as a woven or knitted textile of construction resistant to substantial elongation upon the application of tensile forces. A woven structure of nylon yarns may be preferred.

If a ring element is used, it may be of any suitable construction including metal, plastic or an extended loop of pliable rope or cord material. Such materials have the ability to withstand substantial loading without undergoing plastic deformation or breakage. As will be discussed further hereinafter, the ring element 32 may pass in sliding relation over a retaining stud 48 which extends through the opening in the ring element 32 such that the ring element 32 may be pulled away from the retaining stud 48 when tension is applied to the tethering elements 30. In the event that the ring element 32 is not utilized, it is contemplated that this function may be carried out by the loop 33 which may likewise accept the retaining member therein.

It is to be appreciated that while the illustrated embodiment utilizes a female member such as the ring element 32 or loop 33 disposed in sliding relation over a male retaining member, such a configuration for retaining the tethering elements in a shortened condition it is in no way critical to the present invention and any number of other releasable attachment mechanisms may likewise be utilized. Accordingly, by way of example only and not limitation, it is contemplated that the female ring element 32 may be substituted with a male element for disposition in sliding relation within a supporting female retaining member if desired.

In the exemplary quick release system illustrated in FIG. 2, an actuation mechanism 36 including a support structure 38 is operatively connected to a gas emitting inflator 40 which is activated by an initiator 41 such as a pyrotechnic squib or other suitable device as will be well known to those of skill in the art. The gas emitting inflator 40 is stored within a housing 42 which may include one or more vent openings 43 for transmission of inflator gas outwardly from the module away from the air bag 20. As illustrated, such vent openings 43 are normally in fluid communication with gas discharge ports 44 generally surrounding the diffuser portion 45 of the inflator 40. As will be appreciated, while the support structure 38 of the actuation mechanism 36 is illustrated as being connected to the gas emitting inflator 40, it is likewise contemplated that any number of other arrangements may also be utilized. By way of example only, it is contemplated that the actuation mechanism 36 may be located remote from the inflator 40 and attached directly to the housing 42.

According to the illustrated embodiment, the ring element 32 or loop 33 on the anchor strap 31 is disposed in sliding relation over the retaining stud 48 which is secured in substantially stable relation to the housing 42. The retaining stud 48 is disposed in butting or notched relation to a tether blocking element 49 such as a plate or notched post. As will be appreciated, in such an arrangement the ring element 32 or loop 33 will be anchored in place with the retaining stud 48 and tether blocking element 49 preventing the withdrawal of the ring element 32 or loop 33 thereby holding the anchor strap 31 in place. The tethering elements 30 which are fixedly attached to the anchor strap 31 are likewise anchored against outward movement as best seen in FIG. 3A. Accordingly, the expanded profile of the air bag 20 is limited due to the anchored relation between the anchor strap 31 (or tethering elements 30) and the stationary retaining stud 48.

According to the illustrated embodiment, the tether blocking element 49 is carried within a plunger element 50 which is held within the interior of the support structure 38 at the end of the inflator 40. The support structure 38 has a substantially hollow tubular shape including interior walls 39 defining an axial opening into which the plunger element 50 and an initiator device 60 may be inserted during assembly.

The support structure 38 includes a first support end 70 of a substantially flanged configuration that is secured directly to the head portion of the inflator 40. The first support end 70 of the support structure 38 may be secured to the inflator 40 by any suitable method, such as welding. In the illustrated embodiment, the support structure 38 also includes a spacing shoulder 74 which is sized larger than an end opening in the housing 42 such that the support structure 38 is limited from going through the end opening within the housing 42 and is properly positioned during assembly. The spacing shoulder 74 is preferably integrally formed with the support structure 38 such as by machining or molding but may also be provided as a separate piece attached to or slipped over the support structure 38.

According to the illustrated embodiment, the support structure 38 includes a first guide channel 76 which extends longitudinally along at least a portion of the distance between the spacing shoulder 74 and the first support end 70 of the support structure 38 such that the tether blocking element 49 passes through the first guide channel 76 and into the plunger element 50 as shown. The support structure 38 further includes a threaded end portion 78 which extends past the spacing shoulder 74 through the end opening of the housing 42 for mating with a cap nut 80 to secure the inflator 40 and the actuation mechanism 36 to the housing 42.

In the illustrated embodiment, the plunger element 50 may be integrally formed from a plastic material and has a generally cylindrical shape. The plunger element 50 is seated within the interior walls 39 of the support structure 38 and has a diameter which is slightly smaller than the axial opening between the interior walls 39 such that the plunger element 50 is may slide relative to the interior walls 39. The plunger element 50 includes a first radial opening which is sized for the receipt of the tether blocking element 49. The plunger element 50 also includes a second radial plunger hole for the receipt of a moveable vent blocking device 85.

In the illustrated embodiment, the plunger element 50 includes a shear feature 52 which is illustrated as a flange located at the end of the plunger element 50. The shear feature 52 is preferably integrally formed with the plunger element 50, but may also be a separate piece attached to the plunger element 50. The shear feature 52 is sized larger than the axial opening within the support structure 38 such that the sheer feature 52 engages the support structure 38 during insertion to limit the insertion of the plunger element 50 into the support structure 38.

The plunger element 50 includes an axial plunger bore 54 in which the initiator device 60 such as a pyrotechnic squib, pneumatic actuator or the like is seated prior to activation. The initiator device 60 preferably is activated in response to a signal from a control device such as an on-board computer 27 based upon inputs from a deceleration sensor, the seat position sensor 22, the optical scanner 24 and any other sensor as may be used to measure the nature of the occupant and the severity of the impact event taking place. Upon activation, the initiator device 60 produces a pressure wave that presses against a plunger reaction surface 57. The application of such force causes the shear feature 52 to break off and permits the plunger element 50 to slide within the support structure 38 until engaging the head of the inflator 40 which acts as a stop surface.

In the illustrated arrangement wherein a vent blocking element 85 is utilized in conjunction with the actuation mechanism 36, the vent blocking element 85 includes an upwardly projecting arm portion 86 which may be snap fittedly attached in the plunger element 50. The vent blocking element 85 also includes a slide portion 87 extending at generally a right angle to the arm portion 86. Thus, in the illustrated embodiment, the retaining stud 48, tether blocking element 49, and vent blocking element 85 are arranged in a substantially "Z" shaped cross sectional profile.

In the illustrated exemplary tether release assembly the vent blocking element 85 is moveable within a second guide channel 77 within the support structure 38 so as to at least partially block an inflator vent opening 43 upon activation of the initiator device 60. In FIG. 2, the slide portion 87 is shown in a first position in solid lines in which the inflator vent opening 43 is open thereby lowering the amount of gas available for inflation of the air bag cushion 20 and is illustrated in phantom lines in a second position in which the slide portion 87 is blocking the inflator vent opening 43 within the housing 142 thereby directing a larger quantity of available inflator gas into the air bag cushion 20.

Of course it is also contemplated that other blocking arrangements may be used to direct additional inflator gas to the air bag cushion. By way of example only and not limitation, one such arrangement may utilize a slide portion 87 with one or more gas transmission openings normally aligned with the inflator vent opening 43. Upon movement of the slide portion 87 the gas transmission openings would move out of alignment with the inflator vent opening 43 thereby blocking gas flow.

In the illustrated exemplary assembly, prior to activation of the inflator 40 the air bag cushion 20 is stored in a folded condition atop the inflator 40. Also, prior to activation of the inflator 40, the tether blocking element 49 as well as the optional vent blocking element 85 are held in a first position by the shear feature 52 such that the retaining stud 48 and tether blocking element 49 hold the anchor strap 31 in place. In addition, the slide portion 87 of the vent blocking element 85 is misaligned with the inflator vent opening 43 such that the inflator vent opening 43 is open thereby permitting the egress of inflator gas outwardly from the housing 42.

Upon sensing predetermined vehicle and occupant conditions, a signal is sent to the inflator initiator 41 thereby activating the inflator 40. Based upon the measurement of impact severity such as by a deceleration meter and occupant conditions including the position and/or physical character of the occupant 14 as measured by the seat position sensor 22, optical scanner 24 and other sensors as may be utilized, a signal is also sent from the onboard computer 27 to the initiator device 60 advising the initiator device 60 as to whether the first position is to be maintained or whether the initiator device 60 is to be activated at a predetermined time during activation of the inflator 40 to move the tether blocking element 49 thereby permitting the anchor strap 31 to slide away from the retaining stud 48. According to the potentially preferred practice, the initiator device 60 is activated when conditions indicate that a deeper profile and larger volume is required and will remain in a deactivated state when conditions indicate that an air bag of more shallow profile and lower volume is desirable.

As previously indicated, upon activation the initiator device 60 produces a pressure wave which presses against the reaction surface 57 of the plunger element 50 and quickly forces the plunger element 50 towards the head portion of the inflator 40. This movement carries the tether blocking element 49 as well as any optional vent blocking element 85 within the plunger element 50 from the first position illustrated in FIG. 2 to a second position wherein the plunger element 50 is in contact with the head portion of the inflator 40. Such movement rapidly opens a path of egress for the ring element 32 or loop 33 disposed over the retaining stud 48 thereby permitting the ring element 32 or loop 33 to slide out of engagement with the retaining stud 48 as tension is applied to the anchor strap 31. This tension arises due to the outward expansion of the air bag cushion 20 as it is filled with inflator gas. If desired, such tension may include both a horizontal as well as a vertical force component arising from an angled relation between the anchor strap 31 and the retaining stud 48 so as to promote sliding disengagement from the retaining stud 48. Simultaneously with such disengagement, the vent blocking element 85 covers the vent opening 43 thereby increasing the quantity of inflation gas available to inflate the air bag cushion 20.

As illustrated through simultaneous reference to FIGS. 3A and 3B, in the event that the actuation mechanism 36 associated with the variable profile air bag cushion 20 is activated, the effective length of the tethering elements 30 is increased from the arrangement in FIG. 3A thereby permitting the air bag 20 to assume a substantially extended profile and increased volume as illustrated in FIG. 3B. In the illustrated arrangement, when the anchoring strap 31 is released the tethering elements 30 are permitted to move outwardly with the air bag cushion. However, the tethering elements 30 nonetheless remain secured at the surface of the air bag cushion at the fixed points of connection 25 such that even in the fully inflated state, the tethering elements 30 apply shaping tension to the surface of the air bag cushion 20. It has been found that maintaining such a stable connective relationship may be used to provide a continued degree of control over the final expanded profile of the air bag 20. More particularly, it has been found that by maintaining some degree of tethering the available increased volume of the air bag 20 may be used to selectively increase the depth dimension of the final expanded profile far more than would naturally occur if tethering restraint is eliminated entirely. As will be appreciated, the incorporation of the vent blocking element 85 for operation in conjunction with the variable volume actuation mechanism 36 permits the discharge of an enhanced quantity of inflator gas into the air bag cushion 20 in the larger expanded condition of FIG. 3B without the need for any additional initiating device.

Importantly, it is to be understood that while one potential cooperative tether arrangement and release system have been illustrated and described, the present invention is in no event to be limited thereto. To the contrary, the illustrated and described tether arrangement and release system are exemplary and explanatory only and it is thus contemplated that any other arrangement for extending the operative profile of the air bag cushion 20 may likewise be utilized if desired. By way of example only and not limitation, various exemplary arrangements to effect such an extended operative profile are described in U.S. Pat. No. 6,454,300 to Dunkle et al. which is incorporated by reference in its entirety as if fully set forth herein.

Regardless of the arrangement utilized to effect extension of the air bag cushion profile, according to one practice it is contemplated that such an extension may operate in conjunction with at least one selectively activatable cushion vent arrangement 62. As best seen through simultaneous reference to FIGS. 3A, 3B, 4A and 4B, in a first embodiment the exemplary cushion vent arrangement incorporates a folded cover element designated generally as 63 such as a strip of fabric, polymeric film or other pliable material disposed across a vent opening 64 such as an aperture extending between the interior and the exterior of the air bag cushion 20. While the cover element is illustrated as being disposed at the interior of the air bag cushion 20, it is likewise contemplated that it may be disposed at the exterior if desired.

As best seen through simultaneous reference to FIGS. 4A and 4B, the cover element 63 is held in fixed relation to the air bag cushion 20 at an attachment location 65 disposed outboard of the vent opening 64 by stitching or other suitable attachment systems such as adhesive bonding, welding and the like. In this arrangement a displaceable blocking portion 66 of the cover element 63 is disposed in covering relation over the vent opening 64. Accordingly, in the normal arrangement illustrated in FIG. 4A the blocking portion 66 forms a covering over the vent opening 64 (shown in hidden lines) thereby at least partially blocking gas flow out of air bag cushion 20 through the vent opening 64. The sealing relation of the blocking portion across the vent opening 64 is enhanced by the internal pressure within the air bag cushion 20.

In the embodiment illustrated in FIGS. 4A and 4B, a portion of the cover element 63 is collected in a pleat structure 67 disposed between the attachment location 65 and the vent opening 64. The pleat structure 67 is normally held in folded relation by one or more break-away seams 68, 68'. While only a single fold pleat structure is illustrated, it is likewise contemplated that other pleat structures including multiple fold pleat structures and the like may likewise be utilized. The break-away seams 68, 68' may be of any suitable construction including stitching, adhesive bonding, welding or the like. The strength of the break-away seams 68, 68' is selected such that they will rupture upon the application of a sufficient tensioning force pulling in the direction away from the attachment location in a manner as will be described further hereinafter.

In the embodiment illustrated in FIGS. 4A and 4B, the pleat structure 67 includes a cut-out portion 69. Upon rupture of the break-away seams 68, 68' the cut-out portion 69 defines an opening within the cover element 63. As best illustrated in FIG. 4B, upon the application of tension across the cover element 63 in a direction extending away from the attachment location 65, the break-away seams 68, 68' experience rupture. This rupture permits at least the partial collapse and spreading of pleat structure 67. The resulting slack is taken up by pulling the available material in the cover element 63 away from the attachment location 65. The cut-out portion 69 is thereby pulled over the vent opening 64 so as to give rise to substantial alignment between the cut-out portion 69 and the vent opening 64 while moving the blocking portion 66 away from the vent opening 64. Inflation gas is thereby permitted to pass out of the air bag cushion 20 through the vent opening 64.

If desired, it is contemplated that tension to the cover element 63 may be introduced through one or more tensioning straps 71 which extend away from the cover element 63 and which are operatively attached to the tethering elements 30 as shown or to a surface of the air bag cushion 20 at a remote location. As illustrated, the operative length of the tensioning straps is such that they are not placed into tension when the air bag cushion is inflated to a first diminished profile (FIG. 3A). However, in those instances when the air bag cushion 20 is inflated to an enhanced profile (FIG. 3B) the tensioning straps 71 are placed into tension as the tethering elements move outwardly thereby transmitting such tension across the pleat structure 67 and causing rupture of the break-away seams 68, 68'. The resulting slack within the cover element 63 is then taken up as inflation proceeds.

Movement of the cover element 63 in the desired direction may be facilitated by the use of one or more travel guides 73. By way of example only, in the illustrated arrangement the travel guides are half loop structures attached to the interior surface of the air bag cushion 20 and extending over the cover element 63 between opposing lateral sides such that the cover element 63 may slide through the travel guides in a predefined bounded path during extension.

While the operative attachment between the tensioning straps 71 and the tether elements 30 may provide a mechanical advantage by increasing the operative travel distance for the tensioning straps, it is likewise contemplated that other arrangements may also be used if desired. By way of example only, and not limitation, it is contemplated that the tensioning straps 71 may extend from the cover element 63 to a location on the surface of the air bag cushion 20 such that the expansion of the air bag cushion 20 imparts the desired tensioning force to the tensioning straps 71. It is also contemplated that the tensioning straps 71 may be eliminated entirely if desired. In such a construction, the cover element 63 may be attached at both ends to the air bag cushion 20 and natural extension during enhanced inflation is used to impart the desired tension.

The vent arrangement illustrated in FIGS. 4A and 4B is normally closed so as to reduce venting when the air bag cushion is deployed to a restricted profile (FIG. 3A) and to increase venting when the air bag cushion is deployed to a deep profile (FIG. 3B). However, it is also contemplated that the converse relationship may also be achieved if desired. That is, venting may be selectively increased when the air bag cushion is deployed to a deep profile. An exemplary vent arrangement to achieve such characteristics is illustrated in FIGS. 5A and 5B wherein components corresponding to those previously illustrated and described are designated by like reference numerals increased by 100.

Referring to FIGS. 5A and 5B an activatable vent arrangement 162 is illustrated which is normally open in a gas emitting orientation (FIG. 5A). As shown, in this arrangement the cover element 163 includes a cut out portion 169 which is normally disposed over the vent opening 164 so as to allow for the venting passage of inflation gas through the vent opening 164. The cover element 163 includes a pleat structure 167 of substantially uninterrupted construction located outboard of the vent opening 164 between the vent opening 164 and the attachment location 165. In operation, when adequate tension is applied across the cover element 163 such as through tensioning straps 171, the cut out portion 169 is pulled away from the vent opening 164 such that the material within the pleat structure 167 is moved at least partially over the vent opening 164 (FIG. 5B) thereby blocking the vent opening 164.

It is contemplated that any number of activatable vent arrangements other than the collapsible pleat structures illustrated in FIGS. 4A, 4B, 5A and 5B may likewise be utilized to provide selective venting characteristics. By way of example only and not limitation, one such activatable vent arrangement 262 incorporating a vent cover element 263 in the form of a patch structure such as a substantially flat piece of fabric, film or the like is illustrated in FIGS. 6A, 6B, 7, 8A and 8B. In these figures components corresponding to those previously illustrated and described are designated by like reference numerals increased by 200. As best illustrated by reference to FIG. 7, the vent cover element 263 is secured in place over the vent opening 264 by intermittent attachment seams 265 extending along perimeter segments of the cover element 263. It is contemplated that the attachment seams 265 may be of any suitable construction to effect secure attachment such as sewn seams, welded seams or the like. Due to the intermittent coverage of the attachment seams around the perimeter, openings 269 are formed in a defined pattern around the cover element 263. These perimeter openings 269 thus define gas passageways through which inflation gas may be vented.

As best illustrated through simultaneous reference to FIGS. 6A and 8A, the cover element 263 may be operatively secured to a tensioning strap 271 which extends away from the cover element 263 to the tethering elements 230. In the illustrated embodiment the length of the tensioning strap 271 is such that when the air bag cushion is inflated to the diminished profile (FIG. 6A) the cover element 263 is in relaxed relation to the air bag cushion 220 and the vent opening 264. This relaxed relationship allows pressurized inflation gas to vent through the openings 269 around the perimeter of the cover element 263. As best illustrated through simultaneous reference to FIGS. 6B and 8B, when the air bag cushion 220 is inflated to an enhanced profile (FIG. 6B), the tensioning strap 271 is pulled tight thereby pulling the cover element 263 into a sealed relation across the vent opening 264 (FIG. 8B). This action thereby eliminates the relaxed relation between the air bag cushion 220 and the cover element 263 so as to restrict the quantity of inflation gas which can be vented through the openings 269.

It is to be understood that while the patch-like cover element 263 has been illustrated as being located on the exterior of the air bag cushion 220, it is likewise contemplated that such a cover element and associated perimeter seams may be located at the interior of the air bag cushion if desired. As will be appreciated, if such an interior placement is utilized, when the cover element 263 is in a relaxed state across the surface of the cushion such as during the low profile expansion of the air bag cushion, the internal gas pressure will tend to press the cover element 263 against the surface of the air bag cushion 220 thereby closing down gas passage around the cover element. Conversely, when the cover element 263 is pulled away from the surface of the air bag cushion 220 such as during the extended profile expansion of the air bag cushion, openings around the perimeter of the cover element will tend to open up thereby increasing venting capacity.

It is also contemplated that a tension sensitive patch structure may be arranged within the air bag such that it is held in tension when the air bag is inflated to a low profile and is released when the air bag is inflated to a deeper profile. By way of example only and not limitation, one such activatable vent arrangement 262' incorporating a vent cover element 263' in the form of a patch structure such as a substantially flat piece of fabric, film or the like at the interior of the air bag cushion 220' is illustrated in FIGS. 9A and 9B. In these figures components corresponding to those previously illustrated and described in relation to FIGS. 6A and 6B are designated by like reference numerals with a prime. The vent cover element 263' may be of a configuration as illustrated in FIG. 7, being secured in place over the vent opening 264' by intermittent attachment seams 265' extending along perimeter segments of the cover element 263'. Due to the intermittent coverage of the attachment seams around the perimeter, openings are formed in a defined pattern around the cover element 263'. These perimeter openings thus define gas passageways through which inflation gas may be vented.

As best illustrated through reference to FIG. 9A, in the illustrated embodiment the cover elements 263' may be operatively secured to tensioning straps 271' which extend away from the cover elements 263' to the releasable anchor line 231'. In the illustrated embodiment the length of the tensioning straps 271' is such that when the air bag cushion is inflated to the diminished profile (FIG. 9A) the cover elements 263' are in a tensioned condition pulled away from the vent openings 264'. In the illustrated arrangement with the cover elements at the interior of the cushion, this tension causes gas emission openings to open around the cover elements 263' thereby increasing venting capacity. As will be appreciated, if a reduced venting capacity is desired at the low profile deployment condition of FIG. 9A, this venting characteristic may be achieved by arranging the cover elements 263' across the exterior of the air bag cushion. Such external placement will cause the cover elements to be pulled inwardly when the tensioning straps 271' are under pressure in a manner similar to that shown in FIG. 8B thereby reducing venting.

The tensioning straps 271' may engage the anchor line 231' at ring elements 281' so as to permit an easy sliding relation. However, it is also contemplated that other attachment arrangements such as integral loop structures and the like may also be utilized. As best illustrated through reference to FIG. 9B, in the illustrated embodiment when the air bag cushion 220' is inflated to an enhanced profile (FIG. 6B) by release of the anchor line 231', the anchor line 231 slidingly disengages from the tensioning straps 271'. This release eliminates the tension through the tensioning straps 271'. In the illustrated arrangement wherein the cover elements 263' are at the interior of the air bag cushion, the release of this tension causes the cover elements 263' to be pushed outwardly by the internal gas pressure thereby substantially sealing the vent openings. Conversely, in the event that the cover elements 263' are disposed at the exterior of the air bag cushion the release of inwardly pulling tension provides increased venting capacity in the manner as described in relation to FIG. 8A.

According to still another practice, it is contemplated that variable venting may be carried-out across the wall of the inflator housing to achieve desired tensioning characteristics despite different inflation profiles. One such venting arrangement is illustrated in FIGS. 10–12C wherein elements previously described are designated by like reference numerals within a 300 series. As will be appreciated, for ease of understanding, the tension activated venting assembly for use across a wall of the inflator housing is illustrated substantially independently from any variable vents in the air bag cushion. However, it is contemplated that such an assembly may be operated in conjunction with any of the cushion vents as previously described.

FIG. 10 illustrates a quick release system in which venting through an opening in the inflator housing 342 is regulated by the extension of a first pleat 367 and a second pleat 367' in a cover element 363. As with the previously described arrangements, tethers 330 of variable operative length are operatively connected to an anchor strap 331. The anchor strap 331 may be held at a release assembly by a ring element 332 positioned over a stationary retaining stud 348 which is secured to the housing wall 342. A loop 333 formed in the anchor strap 331 may serve the same function as the ring element 332. The actuating mechanism 336 including support structure 338 is operatively connected to the gas emitting inflator 340. According to the illustrated arrangement, inflation gas may be vented through the housing 342 in a controlled manner by the cooperative movement of the vent blocking element 385 in selective blocking relation to a first vent opening 343 in the housing and the extension of the cover element 363 in selective blocking relation to a second vent opening 343' in the housing 342.

In the exemplary construction illustrated in FIG. 10, the actuating mechanism includes an initiator device 360 such as a pyrotechnic squib activated in response to data provided by an on-board computer or other device based upon measurement of occupant and impact conditions. Activation of the initiator device 360 produces a pressure wave against the plunger surface 357 causing shear features 352 break-off thereby permitting the plunger element 350 to slide within the support structure 338 until movement is terminated by contact with the inflator 340. As with the previously described arrangements, ultimately, the ring element 332 (or alternatively, the loop 333) is freed from the retaining stud 348 thereby releasing the anchor strap 331 and ultimately the variable length tethers 330 allowing expansion of the air bag cushion 320. In conjunction with the operative extension of the tethers 330, the first vent opening 343 is blocked by the vent blocking element 385 thereby providing an enhanced volume of inflation gas to the air bag cushion.

In FIG. 10 there is illustrated an additional variable venting assembly 362 for use at a second vent opening 343' within a wall of the inflator housing 342. The variable venting assembly 362 may be used to provide additional venting control so as to permit the maintenance of substantially equal tension within the air bag cushion 320 regardless of the deployment profile. That is, over pressurization is avoided even when enhanced volumes of inflation gas are introduced. In FIG. 10, the venting assembly 362 including a cover element 363 with pleats 367 and 367' is shown in its initial configuration positioned so as to permit venting of inflation gas through the second vent opening 343' This venting arrangement is illustrated in more detail in FIG. 12A. As shown, in the illustrated arrangement the first end 393 of the cover element is bolted, or otherwise firmly anchored by attachment elements 365 to the wall of the housing 342. The second (opposite) end of the cover element is attached to a tensioning strap 371 the function and details of which are illustrated in and described by FIGS. 11A/12A, 11B/12B, and 11C/12C.

As illustrated in FIGS. 11A, 11B, and 11C, one or more tethering elements 330 in the form of straps or webs control the inflated profile of the air bag cushion 320. Tether elements 330 are preferably disposed across the interior of the air bag cushion 320 and extend in a travel path between fixed points 325 at the surface of the air bag cushion 320 and are further connected along the travel path by guide elements 329 such as sleeves or the like. The release or retention of the tethering elements 330 is preferably carried out at the time of inflation of the air bag cushion 320 based on preferred profile characteristics of the air bag cushion 320 derived from measured characteristics of impact severity and the position and physical characteristics of an occupant 314.

As previously described in relation to FIGS. 2, 3A and 3B, the variable operative length tethers limit the profile or depth of the air bag cushion 320. In operation, the profile may also be limited by obstructions encountered by the inflating cushion. By way of example, in FIG. 11A the profile of the cushion is restrained by the close proximity to the occupant 314. When the cushion is restrained by an obstruction, even the reduced volume of inflation gas normally introduced when the vent blocking element 385 is out of alignment with the first vent opening 343 may be excessive. According to the illustrated practice, in order to relieve pressure within the cushion 320 the cover element 363 is held in its initial untensioned position with the second vent opening 343' uncovered. (FIGS. 10 and 12A). Excess inflation gas is thereby vented though both the first vent opening 343 and the second vent opening 343' avoiding the introduction of an excessive quantity of gas into the obstructed air bag cushion. This avoids the application of undue pressure against the obstructing object.

Comparison of FIG. 11A with FIG. 11B reveals the air bag cushion profile under conditions in which the occupant 314 is not positioned in a profile restricting orientation relative to the air bag cushion. With the greater expansion of the air bag cushion profile as illustrated in FIG. 11B, the anchor strap 331 is extended to a restrained length thereby limiting the extension of the variable length tether elements 330 and thus the profile of the air bag cushion 320. As the air bag cushion 320 is inflated and the profile expands to a level such that tension is applied to the tensioning strap 371, tension is placed on the cover element 363 from the tensioning strap 371, causing the stitching 368 of the first pleat 367 to break and allowing material gathered in the first pleat 367 to cover the second vent opening 343' (FIGS. 11B and 12B.) Coverage of the second vent opening 343' restricts venting to a degree so as to increase the amount of inflation gas available to the inflated cushion. However, in this condition a level of venting is nonetheless maintained across the first vent opening 343 to avoid over pressurization of the cushion. In the illustrated arrangement, the travel of the cover element is guided by a pair of guides 373 which serve to ensure alignment of the cover element 363 and the second vent 343'.

In the event that a deeper cushion profile is required, it is contemplated that a signal may be sent from an onboard computer or other device to the initiator 360 thereby causing anchoring strap 331 to be released from anchored relation and allowing extension of the tethering elements to an increased operative length as an increased volume of inflation gas is delivered to the air bag cushion 320 due to coverage of the first vent opening 343 by the vent blocking element 385. As the profile of the air bag cushion is expanded as illustrated by FIG. 11C, the extension produces tension transmitted to the cover element 363 through the tensioning strap 371. As shown in FIG. 12C, under these conditions the stitching 368' securing the second pleat 367' is broken free allowing the material gathered in the second pleat 367' to be pulled over the vent, with the second cut out 369' positioned over the vent, thereby allowing gas to pass through the second vent opening 343'. Thus, a degree of venting across the housing is maintained and any excess gas which is discharged by the inflator 340 may be expelled through the vent opening thereby preventing over pressurization of the air bag cushion. Thus, the emission of gas into the air bag cushion is substantially self adjusting even at high gas discharge levels. The need to precisely match the gas emitting character of the inflator to the air bag cushion is thus avoided. Of course, maintaining venting across the housing 342 when the cushion is inflated to the enhanced profile as shown in FIG. 11C is optional and the second pleat 367' may be eliminated if desired.

Of course, the venting arrangements illustrated for use at the housing may be used in conjunction with any suitable assembly for operative extension of the tether elements. By way of example only and not limitation, various exemplary arrangements to effect operative tether extension are described in U.S. Pat. No. 6,454,300 to Dunkle et al. U.S. Pat. No. 6,237,949 which is incorporated by reference as if fully set forth herein.

As will be appreciated, the displaceable cover element 363, is not dependent upon any particular inflation assembly. Thus, it is contemplated that the cover element 363 may be used in combination with any variable inflation device to adjust the amount of inflation gas introduced into the cushion. By way of example only, it is contemplated that the volume of inflation gas may be controlled by utilization of a multi-stage inflator in combination with the cover element 363. In such a construction it is contemplated that the first vent opening 343 and the corresponding vent blocking element 385 may be present or may be eliminated if desired. By way of example, in such a construction if a diminished inflated profile is desired, only one inflator stage is activated thereby yielding a first volume of inflation gas. If the cushion is obstructed a portion of the inflation gas may be vented through vent opening 343' as in FIG. 12A while venting may be sealed if no obstruction is encountered as in FIG. 12B. Likewise, in the event that an extended inflated profile is desired, a second stage of the inflator may be activated so as to produce an increased volume of inflation gas. Upon activation of the second inflation stage, the vent opening 343' may be covered as in FIG. 12C. Alternatively the vent opening 343' may remain open if desired by simply eliminating the second pleat 367'.

It is to be understood that while the present invention has been illustrated and described in relation to potentially preferred embodiments, constructions, and procedures, that such embodiments, constructions, and procedures are illustrative only and that the present invention is in no event to be limited thereto. Rather, it is contemplated that modifications and variations embodying the principles of the present invention will no doubt occur to those of skill in the art. In particular, it is to be understood that the present invention is in no way limited to any particular mechanism for the retention and release of tethering elements and that all description of such mechanisms is explanatory and exemplary only. It is therefore contemplated and intended that the present invention shall extend to all such modifications and variations as may incorporate the broad aspects of the present invention within the full spirit and scope thereof.

What is claimed is:

1. An air bag safety system for cushioning restraint of a vehicle occupant during an impact event, the safety system comprising:
a variable depth inflatable air bag cushion adapted to be selectively inflatable to one of a first depth and at least a second depth greater than the first depth;
a gas emitting inflator disposed within a walled housing, wherein said walled housing includes at least one vent opening; and
a displaceable vent blocking cover element of substantially pliable material supported at a surface of said walled housing, wherein the cover element is adjustable from a first operative position relative to the vent opening when the air bag cushion is inflated to said first depth and to at least a second different operative position relative to the vent opening when the air bag cushion is inflated to said second depth so as to vary emission of inflation gas through said at least one vent opening in a predefined manner based upon the depth of inflation of the air bag cushion, wherein the cover element is operatively attached to at least one elongate tensioning stray extending in operative relation between the cover element and a shape defining tethering element operatively connected to a surface of the air bag cushion.

2. The safety system according to claim 1, further comprising at least one sensor for measuring at least one condition of the vehicle occupant, wherein said at least one condition is selected from the group consisting of occupant volume, occupant mass, and occupant position and wherein the air bag cushion is selectively inflatable to one of the first depth or the second depth based upon measurement of said at least one condition.

3. The safety system according to claim 1, wherein the cover element is disposed at the interior of said walled housing.

4. The safety system according to claim 1, further comprising a variable inflation device adapted to adjust the volume of inflation gas delivered to the air bag cushion such that a first volume of inflation gas is delivered into the air bag cushion when the air bag cushion is inflated to the first depth and a second greater volume of inflation gas is delivered into the air bag cushion when the air bag cushion is inflated to the second depth.

5. The safety system according to claim 1, wherein the cover element comprises a panel of pliable material including at least a first pleat structure normally disposed outboard of said at least one vent opening such that upon the application of tension across the cover element a portion of the cover element forming the first pleat structure is shifted at least partially over said at lest one vent opening.

6. The safety system according to claim 5, wherein the cover element includes a cut out portion defining an opening normally disposed in at least partial alignment with said at least one vent opening and wherein said cut out portion is moved out of alignment with said at least one vent opening when the portion of the cover element forming the first pleat structure is shifted at least partially over said at least one vent opening.

7. An air bag safety system for cushioning restraint of a vehicle occupant during an impact event, the safety system comprising:
 a variable depth inflatable air bag cushion adapted to be selectively inflatable to one of a first depth or a second depth greater than the first depth;
 a gas emitting inflator disposed within a walled housing, wherein said walled housing includes at least one vent opening; and
 a cover element of substantially pliable material disposed in sliding relation relative to the vent opening, the cover element including a vent blocking portion normally disposed within a first folded pleat structure outboard of the vent opening, the cover element further including an aperture normally disposed within a second folded pleat structure outboard of the first folded pleat structure such that the first folded pleat structure is normally disposed between the second folded pleat structure and the vent opening, the cover element being operatively connected to the air bag cushion such that when the air bag cushion is uninflated or is restrained to an inflation depth less than said first depth, the cover element remains in its normal position with the blocking portion disposed within the first folded pleat structure outboard of the vent opening and such that upon inflation of the air bag cushion to the first depth the cover element is placed into tension thereby shifting the vent blocking portion at least partially over the vent opening without collapsing the second folded pleat structure and such that upon inflation of the air bag cushion to the second depth the aperture within the second folded pleat structure is moved at least partially over the vent opening.

8. The safety system according to claim 7, further comprising at least one sensor for measuring at least one condition of the vehicle occupant, wherein said at least one condition is selected from the group consisting of occupant volume, occupant mass, and occupant position and wherein the air bag cushion is selectively inflatable to one of the first depth or the second depth based upon measurement of said at least one condition.

9. The safety system according to claim 7, wherein the cover element is operatively attached to the air bag cushion by at least one elongate tensioning strap extending between the cover element and at least one shape defining tethering element supported at a surface of the air bag cushion.

10. The safety system according to claim 7, wherein the cover element includes a cut out portion defining an opening normally disposed in at least partial alignment with said at least one vent opening and wherein said cut out portion is moved out of alignment with said at least one vent opening when the vent blocking portion of the cover element forming the first pleat structure is shifted at least partially over said at least one vent opening.

11. An air bag safety system for cushioning restraint of a vehicle occupant during an impact event, the safety system comprising:
 at least one sensor for measuring at least one occupant specific condition during the impact event;
 a variable depth inflatable air bag cushion adapted to be selectively inflatable to one of a first depth or a second depth greater than the first depth based upon a measurement from said at least one sensor;
 a gas emitting inflator disposed within a walled housing, wherein the inflator is adapted to release a volume of inflation gas upon activation of a first initiator;
 an actuatable variable inflation device adapted to vary the volume of inflation gas discharged into the air bag cushion, wherein the variable inflation device comprises a moveable member alignable with a first vent opening within the housing, the moveable member being moveable relative to the vent opening upon activation of a second initiator thereby adjusting the effective venting area of the first vent opening; and
 a cover element of substantially pliable material disposed in sliding relation relative to a second vent opening, the cover element including a cut out portion defining an opening normally disposed in at least partial alignment with said second vent opening, the cover element further including a vent blocking portion normally disposed within a first folded pleat structure outboard of said second vent opening, the cover element being operatively connected to the air bag cushion such that when the air bag cushion is uninflated or is restrained to an inflation depth less than said first depth, the cover element remains in its normal position with the cut out portion disposed in at least partial alignment with said second vent opening and the vent blocking portion disposed within the first folded pleat structure outboard of the vent opening and such that upon inflation of the air bag cushion to the first depth the cover element is placed into tension thereby shifting the vent blocking portion at least partially over said second vent opening.

12. safety system according to claim 11, wherein the cover element is operatively attached to the air bag cushion by at least one elongate tensioning strap extending between the cover element and at least one shape defining tethering element supported at a surface of the air bag cushion.

13. The safety system according to claim 11, wherein the cover element further includes an aperture normally disposed within a second folded pleat structure outboard of the first folded pleat structure such that the first folded pleat structure is normally disposed between the second folded pleat structure and the second vent opening such that upon inflation of the air bag cushion to the first depth the cover element is placed into tension thereby shifting the vent blocking portion at least partially over the second vent opening without collapsing the second folded pleat structure and such that upon inflation of the air bag cushion to the second depth the aperture within the second folded pleat structure is moved at least partially over the second vent opening.

14. The safety system according to claim 11, wherein the first initiator and the second initiator comprise pyrotechnic squib elements.

15. The safety system according to claim 14, comprising no more than two pyrotechnic squib elements.

* * * * *